US012736844B2

(12) United States Patent
Park et al.

(10) Patent No.: US 12,736,844 B2
(45) Date of Patent: Sep. 15, 2026

(54) DISPLAY DEVICE

(71) Applicant: LG ELECTRONICS INC., Seoul (KR)

(72) Inventors: Kuenyoung Park, Seoul (KR); Beomseok Cho, Seoul (KR); Jaeuk Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/022,079

(22) Filed: Jan. 15, 2025

(65) Prior Publication Data

US 2025/0383563 A1 Dec. 18, 2025

(30) Foreign Application Priority Data

Jun. 17, 2024 (KR) ........................ 10-2024-0078361

(51) Int. Cl.
*G02F 1/13357* (2006.01)

(52) U.S. Cl.
CPC .. *G02F 1/133608* (2013.01); *G02F 1/133603* (2013.01); *G02F 1/133606* (2013.01)

(58) Field of Classification Search
CPC ......... G02F 1/133608; G02F 1/133603; G02F 1/133606
See application file for complete search history.

(56) References Cited

U.S. PATENT DOCUMENTS 9,897,748 B2 * 2/2018 Jeong ................ G02F 1/133308
10,754,087 B2 * 8/2020 Kim ..................... G02B 6/0088
2015/0282334 A1 10/2015 Yamamoto
2016/0377908 A1 * 12/2016 Shin .................. G02F 1/133308 349/58
2017/0123259 A1 5/2017 Kim
2018/0364515 A1 * 12/2018 Kim ................... H05K 7/20963
(Continued)

FOREIGN PATENT DOCUMENTS

KR 10-2018-0136816 12/2018
KR 10-2022-0074386 6/2022
KR 10-2023-0003943 1/2023
(Continued)

OTHER PUBLICATIONS

Korean Intellectual Property Office Application No. 10-2024-0078361, Office Action dated Feb. 2, 2025, 7 pages.
(Continued)

*Primary Examiner* — Evan P Dzierzynski
(74) *Attorney, Agent, or Firm* — LEE, HONG, DEGERMAN, KANG & WAIMEY

(57) ABSTRACT

Disclosed is a display device. The display device of the present disclosure may include: a display panel; a frame positioned behind the display panel; a first guide panel positioned between the display panel and the frame, and extending along one side of the display panel; a second guide panel positioned between the display panel and the frame, and extending along the other side of the display panel; and an optical layer positioned between the display panel and the frame, and providing light to the display panel, wherein the second guide panel may be detachably coupled to the first guide panel, wherein the display panel and the frame may be coupled to the first and second guide panels.

14 Claims, 23 Drawing Sheets

(56) References Cited

U.S. PATENT DOCUMENTS

2023/0047516 A1* 2/2023 Won .................. G02F 1/133308

FOREIGN PATENT DOCUMENTS

| | | |
|---|---|---|
| KR | 10-2024-0002087 | 1/2024 |
| KR | 10-2024-0003965 | 1/2024 |
| WO | 2023-132383 | 7/2023 |

OTHER PUBLICATIONS

European Patent Office Application Serial No. 25153163.8, Search Report dated Jul. 11, 2025, 12 pages.

Korean Intellectual Property Office Application No. 10-2024-0078361, Notice of Allowance dated Jun. 16, 2026, 3 pages.

* cited by examiner

DISPLAY DEVICE

CROSS-REFERENCE TO RELATED APPLICATION(S)

Pursuant to 35 U.S.C. § 119(a), this application claims the benefit of earlier filing date and right of priority to Korean Patent Application No. 10-2024-0078361, filed on Jun. 17, 2024, the contents of which are all hereby incorporated by reference herein in their entireties.

BACKGROUND OF THE INVENTION

Field of the Invention

The present disclosure relates to a display device.

Description of the Related Art

As information society develops, the demand for display devices is also increasing in various forms. In response to this, various display devices such as Liquid Crystal Display Device (LCD), Plasma Display Panel (PDP), Electroluminescent Display (ELD), Vacuum Fluorescent Display (VFD), and Organic Light Emitting Diode (OLED) have been researched and used in recent years.

Among these, a liquid crystal panel includes a TFT substrate and a color filter substrate that face each other with a liquid crystal layer interposed therebetween, and may display an image by using light provided from a backlight unit. The backlight unit includes a direct type which provides light to the rear surface of a diffusion plate behind a LCD panel, and an edge type which provides light to the lateral side of a light guide plate behind the LCD panel.

There was an inconvenience in that the guide panel extending along the circumference of the LCD panel had to be configured differently depending on the type of backlight unit.

SUMMARY OF THE INVENTION

It is an object of the present disclosure to solve the above and other problems.

Another object of the present disclosure may be to provide a structure in which a part of a guide panel is shared with a direct type backlight unit and an edge type backlight unit.

Another object of the present disclosure may be to provide a structure in which a remaining part of guide panel is detachably coupled to a part of shared guide panel.

Another object of the present disclosure may be to provide a coupling structure of a guide panel and a frame.

Another object of the present disclosure may be provide a structure that can minimize the shrinkage of guide panel.

In accordance with an aspect of the present disclosure, a display device may include: a display panel; a frame positioned behind the display panel; a first guide panel positioned between the display panel and the frame, and extending along one side of the display panel; a second guide panel positioned between the display panel and the frame, and extending along the other side of the display panel; and an optical layer positioned between the display panel and the frame, and providing light to the display panel, wherein the second guide panel may be detachably coupled to the first guide panel, and wherein the display panel and the frame may be coupled to the first and second guide panels.

BRIEF DESCRIPTION OF THE DRAWINGS

The above and other objects, features and advantages of the present invention will be more apparent from the following detailed description in conjunction with the accompanying drawings, in which.

DETAILED DESCRIPTION

Figure 1:
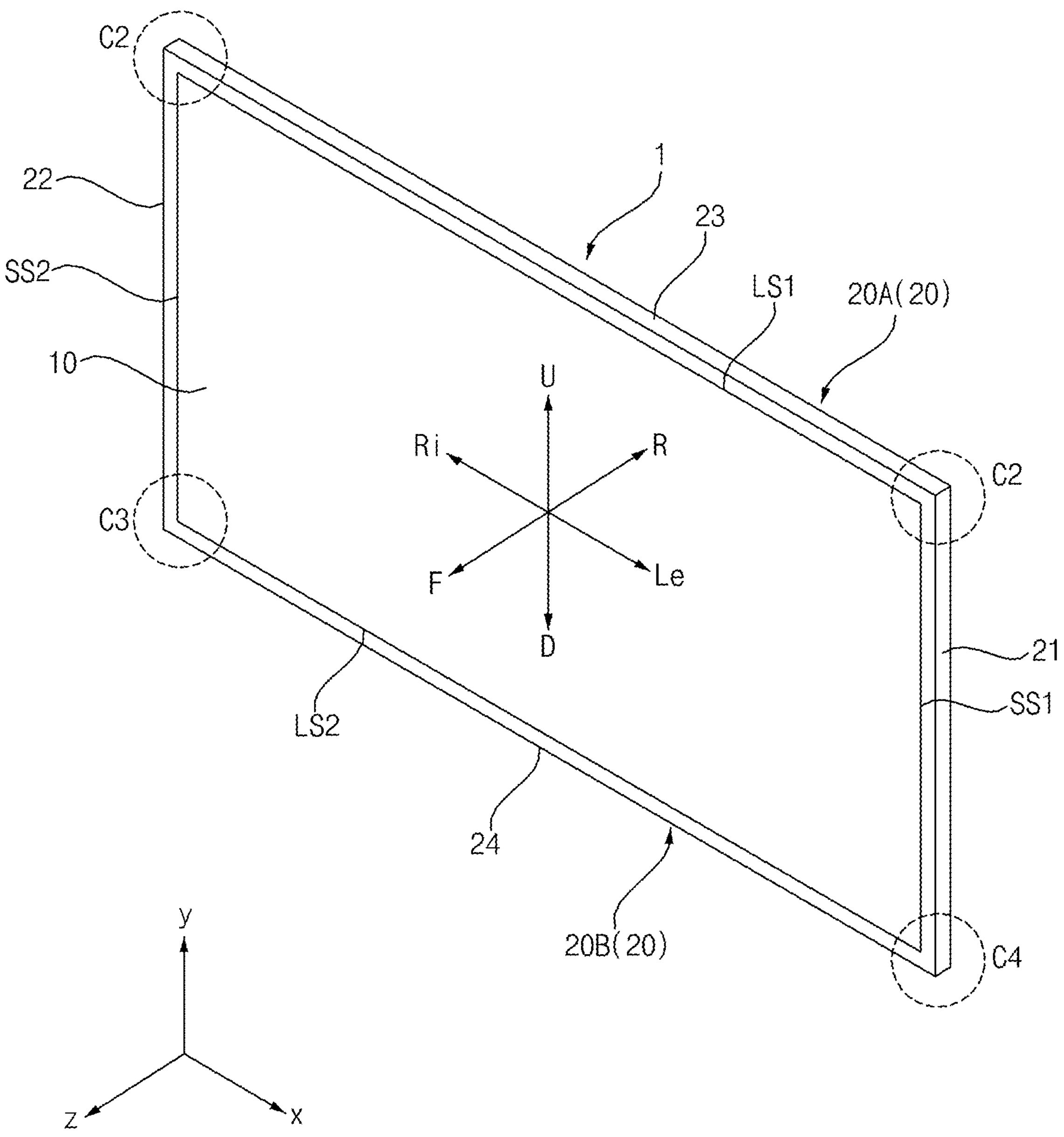
FIGS. 1 to 23 are diagrams illustrating examples of a display device according to embodiments of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Direction indications of up (U), down (D), left (Le), right (Ri), front (F), and rear (R) shown in the drawings are only for convenience of explanation, and the technical concept disclosed in this specification is not limited thereto.

Referring to FIG. 1, a display device 1 may include a display panel 10. The display panel 10 may display an image.

The display device 1 may include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of explanation, it is illustrated and described that the lengths of the first and second long sides LS1, LS2 are longer than the lengths of the first and second short sides SS1, SS2, but it may also be possible that the lengths of the first and second long sides LS1, LS2 are approximately the same as the lengths of the first and second short sides SS1, SS2.

The direction parallel to the long sides LS1 and LS2 of the display device 1 may be referred to as a left-right direction. The first short side SS1 side may be referred to as a left (Le, x), and the second short side SS2 side may be referred to as a right Ri.

The direction parallel to the short sides SS1 and SS2 of the display device 1 may be referred to as an up-down direction. The first long side LS1 side may be referred to as the upper side (U, y), and the second long side LS2 side may be referred to as a lower side D.

The direction perpendicular to the long sides LS1 and LS2 and the short sides SS1 and SS2 of the display device 1 may be referred to as a front-rear direction. The direction in which the display panel 10 displays an image may be referred to as a front (F, z), and the opposite direction may be referred to as a rear R.

The first long side LS1, the second long side LS2, the first short side SS1, and the second short side SS2 may be referred to as an edge of the display device 1. The point where the first long side LS1, the second long side LS2, the first short side SS1, and the second short side SS2 meet each other may be referred to as a corner. The point where the first short side SS1 and the first long side LS1 meet may be referred to as a first corner C1. The point where the first long side LS1 and the second short side SS2 meet may be referred to as a second corner C2. The point where the second short side SS2 and the second long side LS2 meet may be referred to as a third corner C3. The point where the second long side LS2 and the first short side SS1 meet may be referred to as a fourth corner C4.

Figure 2:
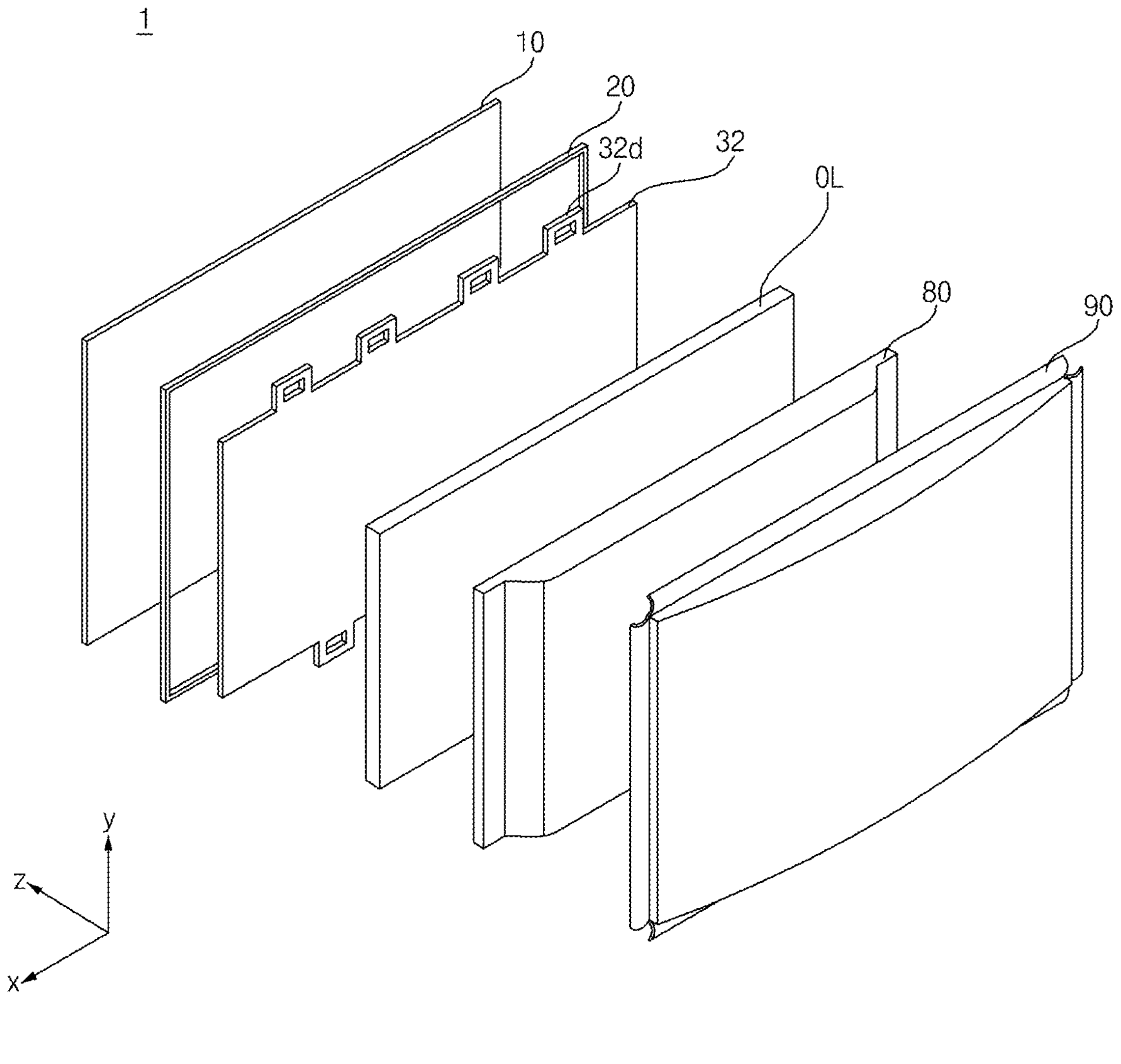

Referring to FIG. 2, the display device 1 may include a display panel 10, a guide panel 20, a backlight unit (OL, 32), a frame 80, and a back cover 90.

The display panel 10 may form the front surface of the display device 1 and may display an image. The display panel 10 may display an image by having multiple pixels that output Red, Green or Blue (RGB) in accordance with the timing of each pixel. The display panel 10 may be divided into an active area where an image is displayed and a de-active area where an image is not displayed. The display panel 10 may include a front substrate and a rear substrate that are opposite to each other with a liquid crystal layer interposed therebetween. The display panel 10 may be referred to as an LCD panel 10.

The front substrate may include multiple pixels composed of red, green, and blue sub-pixels. The front substrate may output light corresponding to the color of red, green, or blue according to a control signal.

The rear substrate may include switching elements. The rear substrate may switch a pixel electrode. For example, the pixel electrode may change the molecular arrangement of a liquid crystal layer according to a control signal input from the outside. The liquid crystal layer may include liquid crystal molecules. The arrangement of liquid crystal molecules may be changed in response to the voltage difference generated between a pixel electrode and a common electrode. The liquid crystal layer may transmit light provided from the backlight unit (OL, 32) to the front substrate or block the light.

The guide panel 20 may surround the circumference of the display panel 10 and cover the side surface of the display panel 10. The guide panel 20 may be coupled to the display panel 10 or may support the display panel 10. The guide panel 20 may be referred to as a side frame 20.

The backlight unit (OL, 32) may be located at the rear of the display panel 10. The backlight unit (OL, 32) may include light sources. The backlight unit (OL, 32) may be coupled to the frame 80 at the front of the frame 80. The backlight unit (OL, 32) may be driven by a full driving method or a partial driving method such as local dimming, and impulsive. The backlight unit (OL, 32) may include an optical sheet 32 and an optical layer OL.

The optical sheet 32 may evenly transmit light from a light source to the display panel 10. The optical sheet 32 may be composed of multiple layers. For example, the optical sheet 32 may include a prism sheet or a diffusion sheet. Meanwhile, a coupling portion 32*d* of the optical sheet 32 may be coupled to the frame 80.

The frame 80 may be located at the rear of the backlight unit (OL, 32) and may support components of the display device 1. For example, a component such as a backlight unit (OL, 32), and a Printed Circuit Board (PCB0 on which multiple electronic devices are located may be coupled to the frame 80. The frame 80 may include a metal material such as an aluminum alloy. The frame 80 may be referred to as a main frame 80, a module cover 80, or a cover bottom 80.

The back cover 90 may cover the rear of the frame 80. The back cover 90 may be coupled to the frame 80. For example, the back cover 90 may be an injection of a resin material. For another example, the back cover 90 may include a metal material.

Figure 3:
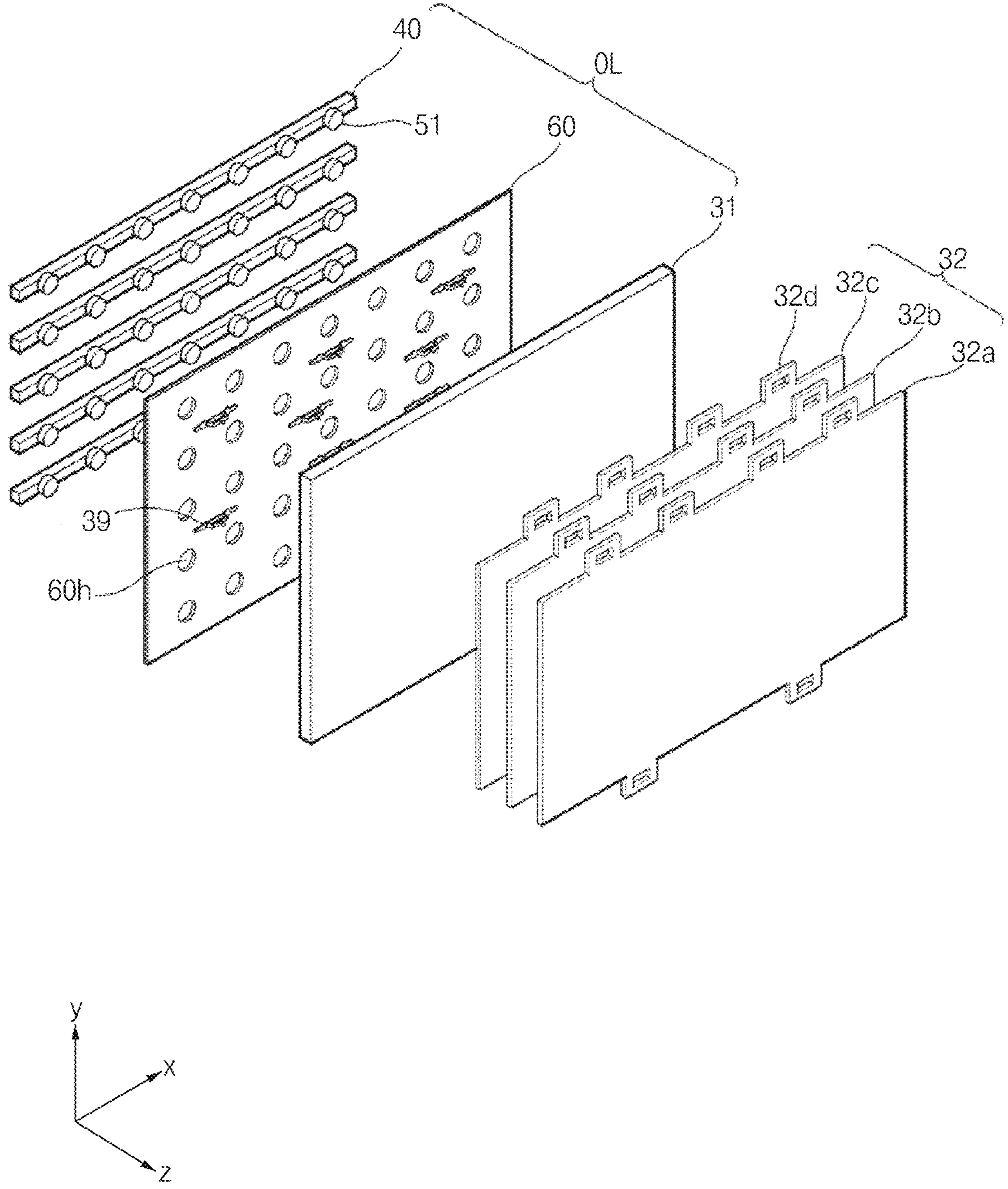

Referring to FIG. 3, the optical layer OL may include a substrate 40, at least one optical assembly 51, a reflective sheet 60, and a diffusion plate 31. The optical sheet 32 may be located in front of the optical layer OL.

The substrate 40 may be provided in the form of a plurality of straps that extend in the left-right direction and are spaced apart from each other in the up-down direction. Alternatively, the substrate 40 may have various shapes such as a plate, a fork, and a sawtooth. At least one optical assembly 51 may be mounted on the substrate 40. An electrode pattern may be formed on the substrate 40 to connect an adapter and the optical assembly 51. For example, the electrode pattern may be a carbon nanotube electrode pattern. The substrate 40 may be composed of at least one of polyethylene terephthalate (PET), glass, polycarbonate (PC), and silicon. The substrate 40 may be a printed circuit board (PCB) on which at least one optical assembly 51 is mounted.

The optical assembly 51 may be a light emitting diode (LED) chip or a light emitting diode package including at least one light emitting diode chip. The optical assembly 51 may be composed of a colored LED or a white LED that emits at least one color among colors such as red, green, and blue. The colored LED may include at least one of a red LED, a green LED, and a blue LED. The optical assembly 51 may be referred to as a light source 51.

The reflective sheet 60 may be located in front of the substrate 40. At least one hole 60*h* may be formed to penetrate the reflective sheet 60, and the optical assembly 51 may be located in the hole 60*h*. The reflective sheet 60 may reflect light provided from the optical assembly 51 or reflected from the diffusion plate 31 in a forward direction.

For example, the reflective sheet 60 may include a metal having a high reflectivity, such as at least one of aluminum Al, silver Ag, gold Au, and titanium dioxide $TiO2$ and/or a metal oxide.

In addition, an air gap may be formed between the reflective sheet 60 and the diffusion plate 31. The air gap serves as a buffer, and light provided from the optical assembly 51 may be widely spread by the air gap. A supporter 39 may be located between the reflective sheet 60 and the diffusion plate 31 and may form the air gap.

The diffusion plate 31 may be located in front of the reflective sheet 60. The diffusion plate 31 may be located between the reflective sheet 60 and the optical sheet 32.

The optical sheet 32 may include at least one sheet. For example, the optical sheet 32 may include one or more prism sheets and/or one or more diffuser sheets. A plurality of sheets of the optical sheet 32 may be adhered to or closely contact with each other.

Specifically, the optical sheet 32 may be composed of a plurality of sheets having different functions. For example, the optical sheet 32 may include a first optical sheet 32*a*, a second optical sheet 32*b*, and a third optical sheet 32*c*. For example, the first optical sheet 32*a* may be a diffusion sheet, and the second optical sheet 32*b* and the third optical sheet 32*c* may be a prism sheet. The diffusion sheet may prevent light emitted from the diffusion plate 31 from being partially concentrated, thereby making the distribution of light more uniform. The prism sheet may collect light emitted from the diffusion plate 31 and provide it to the display panel 10. Meanwhile, the number and/or location of the diffusion sheets and the prism sheets may be changed.

Figure 4:
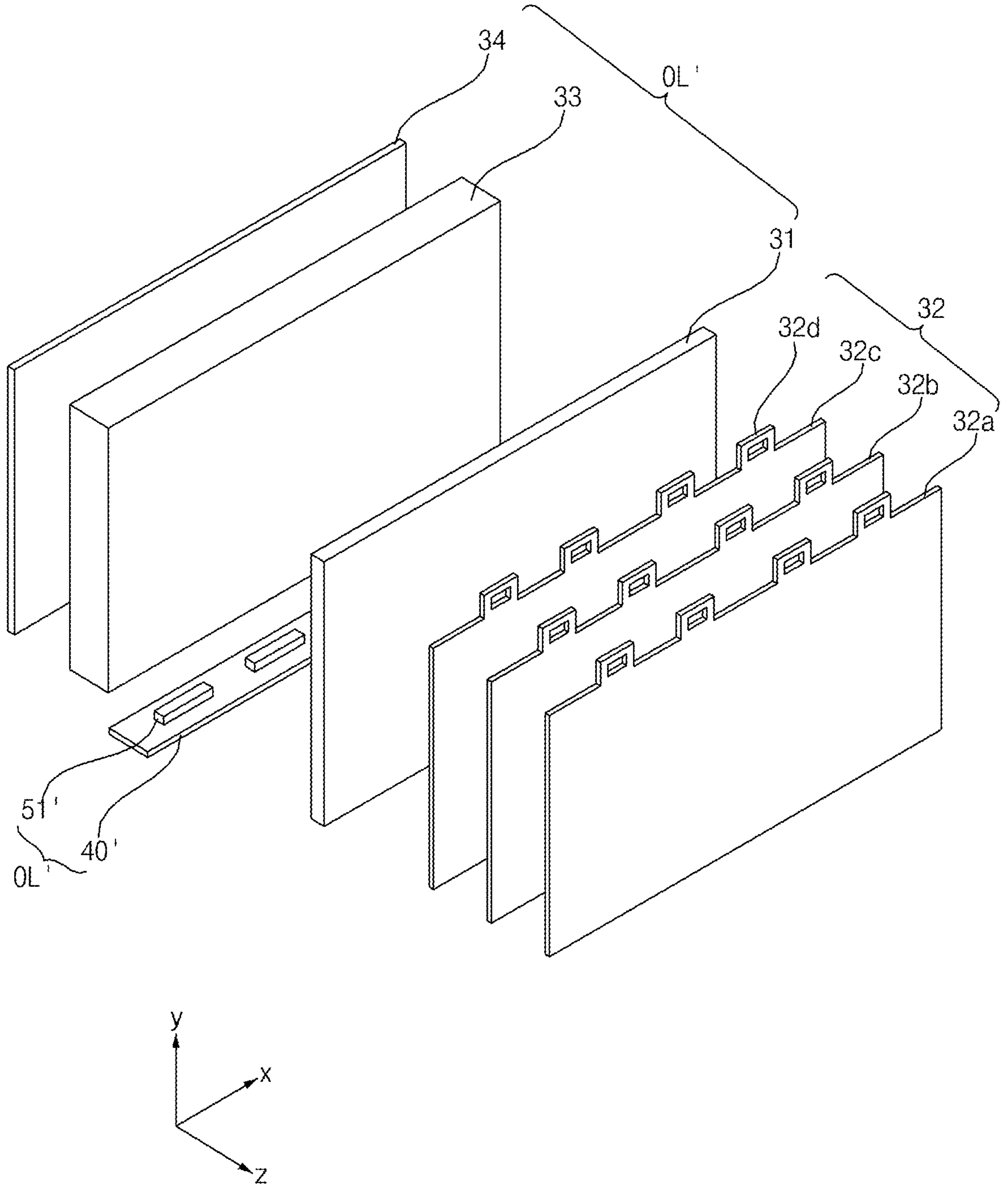

Referring to FIG. 4, an optical layer OL' may include a substrate 40', at least one optical assembly 51', a reflective sheet 34, and a light guide plate 33. The optical sheet 32 may be located in front of the optical layer OL'.

The substrate 40' may extend in the left-right direction and may be adjacent to the circumference of the light guide plate 33. For example, the substrate 40' may be adjacent to the lower side of the light guide plate 33. At least one optical assembly 51' may be mounted on the substrate 40'. That is, the light source of the backlight unit (OL', 32) may be arranged at the edge of the backlight unit (OL', 32). An electrode pattern may be formed on the substrate 40' to connect the adapter and the optical assembly 51'. For example, the electrode pattern may be a carbon nanotube electrode pattern. The substrate 40' may be composed of at least one of polyethylene terephthalate (PET), glass, polycarbonate PC, and silicon. The substrate 40' may be a Printed Circuit Board (PCB) on which at least one optical assembly 51' is mounted.

The optical assembly 51' may be a light emitting diode LED chip or a light emitting diode package including at least one light emitting diode chip. The optical assembly 51' may be composed of a colored LED that emits at least one color among colors such as red, green, and blue, or a white LED. The colored LED may include at least one of a red LED, a green LED, and a blue LED. The optical assembly 51' may be referred to as a light source 51'.

The light guide plate 33 may be located at the rear of the optical sheet 32. Most of the light provided from the optical assembly 51' may be transmitted into the inside of the light guide plate 33. The light guide plate 33 may reflect light transmitted from the optical assembly 51' in a forward direction.

The reflective sheet 34 may be located at the rear of the light guide plate 33. The reflective sheet 34 may reflect light provided from the optical assembly 51' or reflected from the light guide plate 33 in a forward direction. For example, the reflective sheet 34 may include a metal having a high reflectivity, such as at least one of aluminum Al, silver Ag, gold Au, and titanium dioxide TiO2, and/or a metal oxide.

Meanwhile, the optical layer OL' may include a diffusion plate 31 located between the light guide plate 33 and the optical sheet 32.

Figure 5:
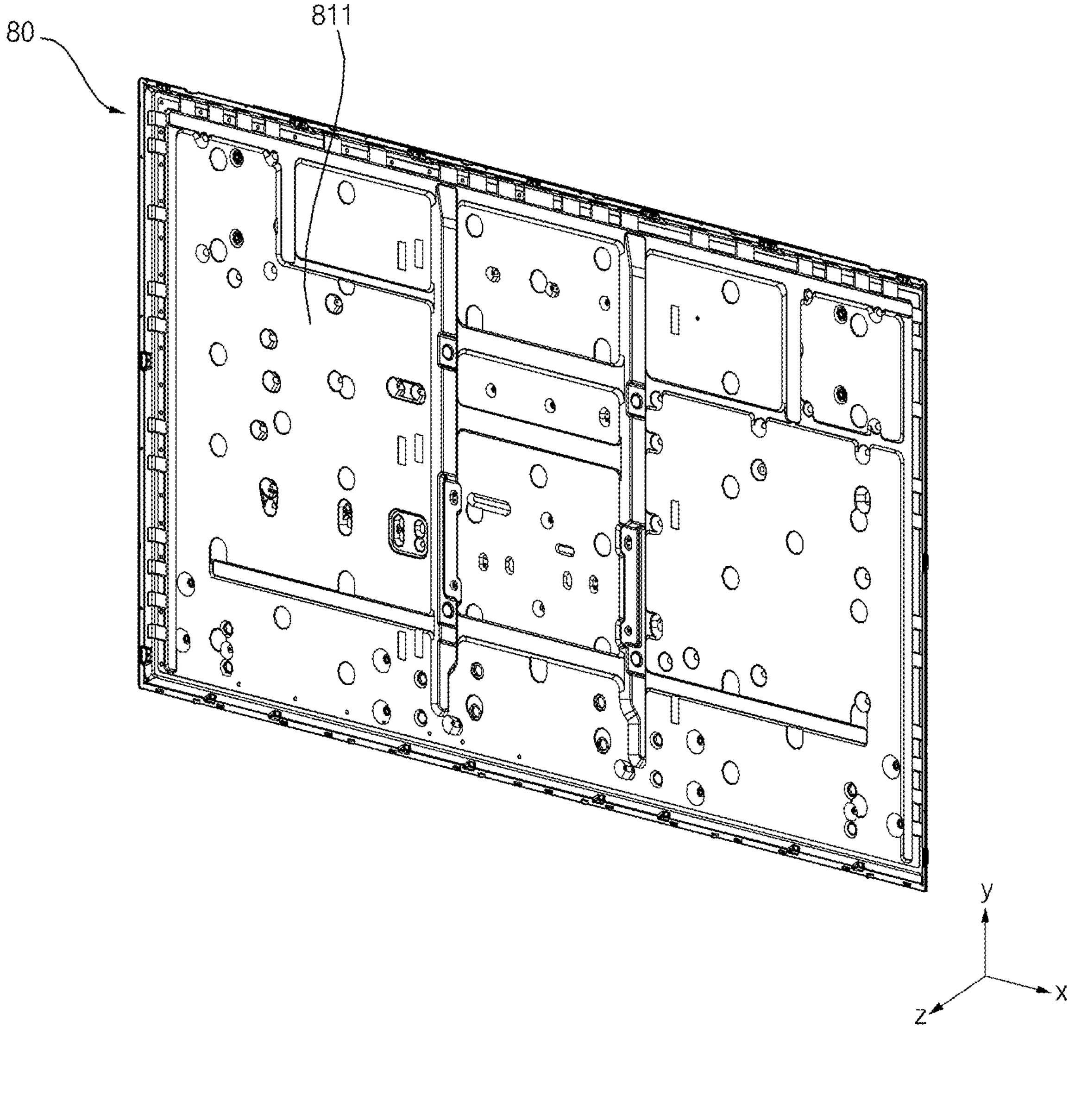
Figure 6:
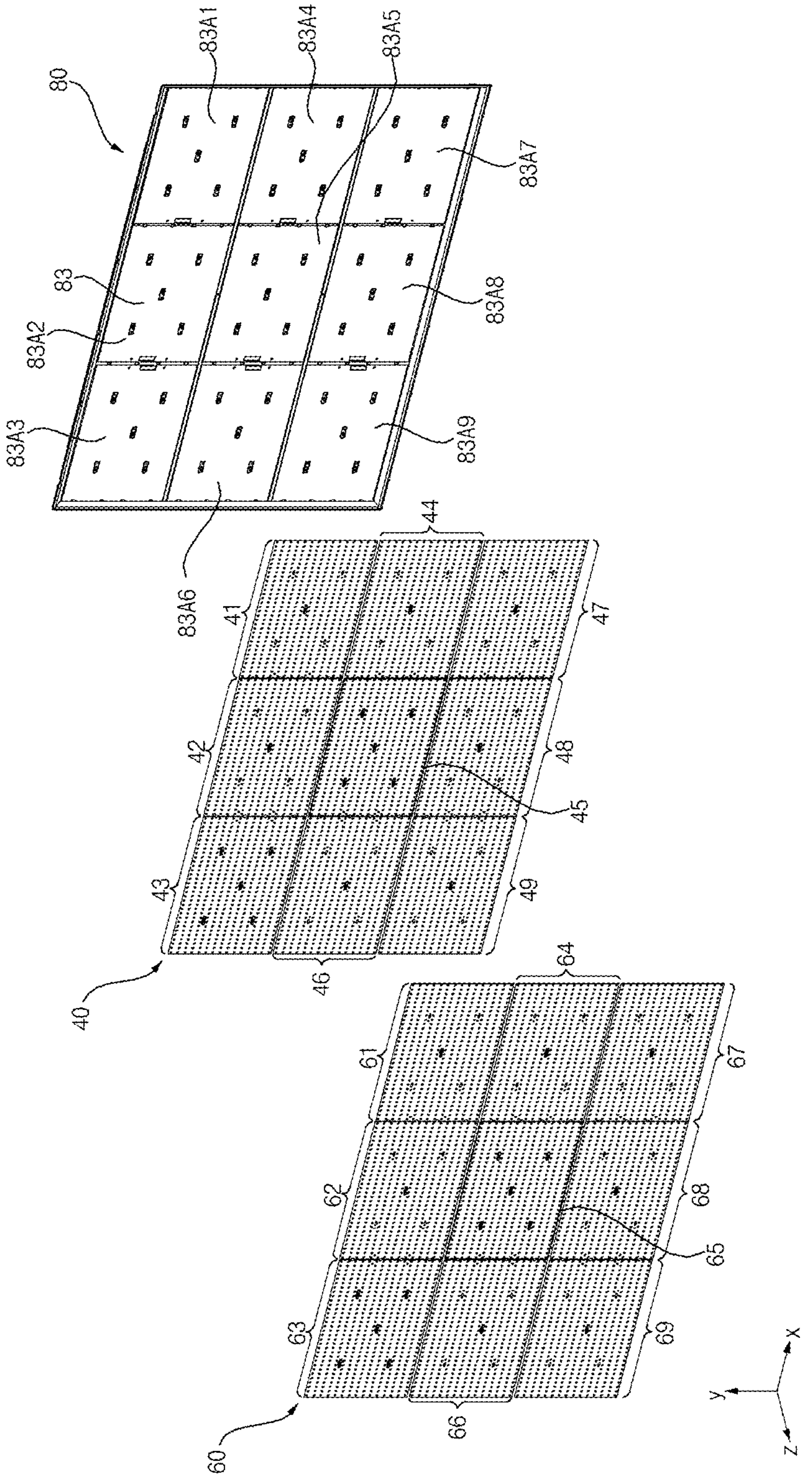
Figure 7:
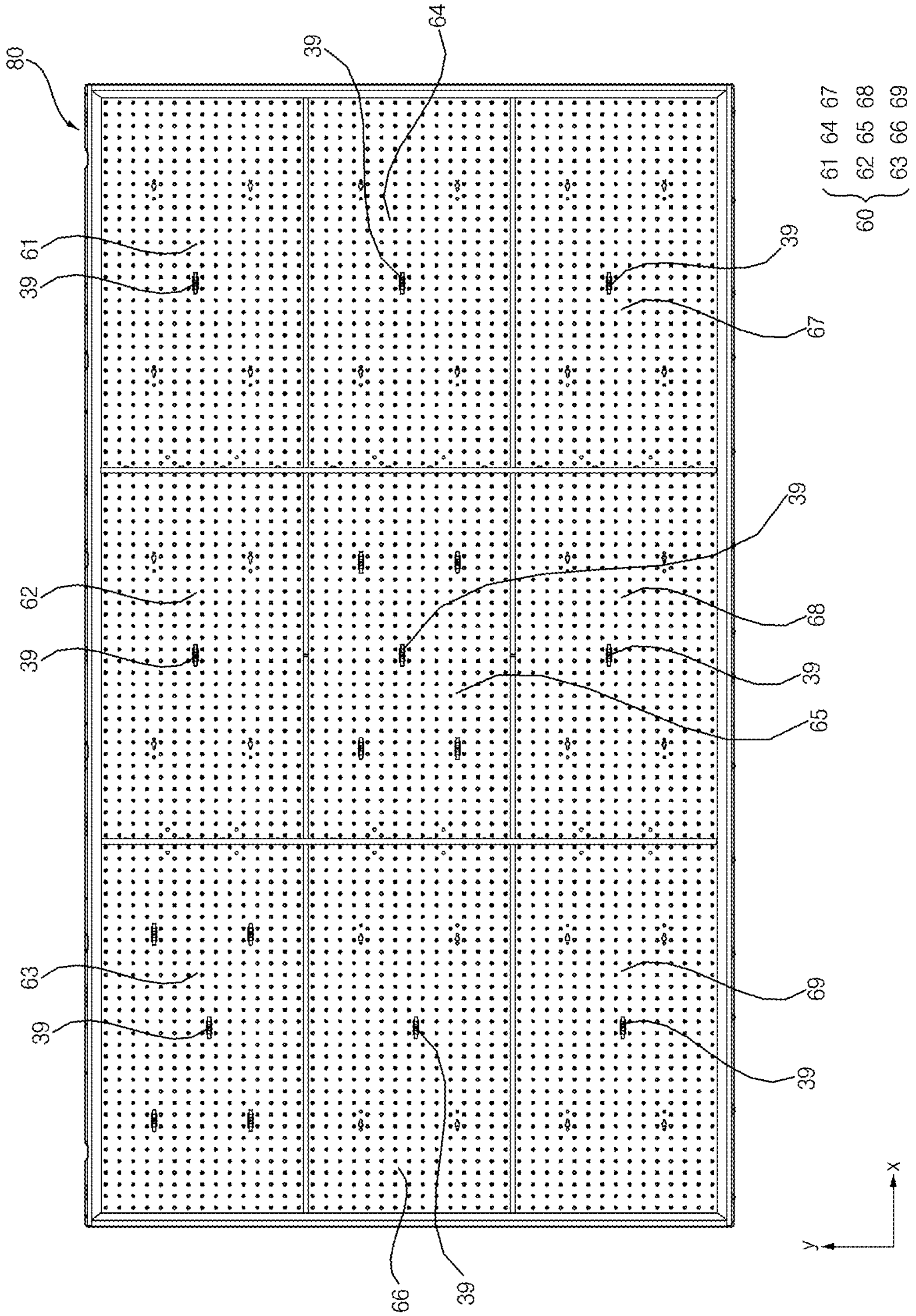

Referring to FIGS. 5 to 7, a flat portion 811 may form the front surface of the frame 80, and a heat dissipation plate 83 may be coupled to the front of the flat portion 811. The heat dissipation plate 83 may be omitted.

The substrate 40 may be coupled to the front surface of the heat dissipation plate 83 or the front surface of the flat portion 811. For example, each of a plurality of substrates 41, 42, 43, 44, 45, 46, 47, 48, 49 in the form of plates may be coupled to each of a plurality of areas 83A1, 83A2, 83A3, 83A4, 83A5, 83A6, 83A7, 83A8, 83A9 of the heat dissipation plate 83.

The reflective sheet 60 may be coupled to the front surface of the substrate 40. For example, each of the plurality of reflective sheets 61, 62, 63, 64, 65, 66, 67, 68, 69 may cover each of the plurality of substrates 41, 42, 43, 44, 45, 46, 47, 48, 49.

The supporter 39 may be detachably coupled to the heat dissipation plate 83 and/or the frame 80 by penetrating the reflective sheet 60 and the substrate 40. The front end of the supporter 39 may support the rear surface of the diffusion plate 31 (see FIGS. 8 to 11). For example, the plurality of supporters 39 may be arranged on the reflective sheet 60.

Referring to FIGS. 8 to 11, a light source 51 may be mounted on the front surface of the substrate 40, and light from the light source 51 may be provided to the display panel 10. For example, a plurality of light sources 51 spaced apart from each other may be mounted on the substrate 40. For example, the light source 51 may include a Light Emitting Diode (LED) and may emit at least one color among colors such as red, blue, and green. The light source 51 may be a mini LED 51. A connector (not shown) may be mounted on the rear surface of the substrate 40, and a power device may supply power to the light source 51 through the connector.

A lens 53 may cover the light source 51 and may be coupled to the front surface of the substrate 40. For example, each of the plurality of lenses 53 may cover each of the plurality of light sources 51. For example, the lens 53 may include at least one of silicone, polymethyl methacrylate (PMMA), and polycarbonate (PC).

Light from the light source 51 may be refracted or reflected by the lens 53 and spread at a wider beam angle than the light source 51. The reflective sheet 60 may have a hole 60*h* through which the lens 53 passes.

The frame 80 may include a flat portion 811, an inclined portion 812, a support portion 813, and a bent portion 814. A press portion 80P may be formed by being pressed from the front surface of the frame 80 in a rearward direction. The flat portion 811 may be flat overall, and the heat dissipation plate 83 may be coupled to the front of the flat portion 811. The inclined portion 812 may extend obliquely in a forward direction from the circumference of the rectangular flat portion 811. The inclined portion 812 may be referred to as a chamfer portion 814. The support portion 813 may be bent in a direction parallel to the diffusion plate 31 from the distal end of the inclined portion 812. The bent portion 814 may be bent in a forward direction from the distal end of the support portion 813.

The guide panel 20 may be extended along the circumference of the display panel 10. The guide panel 20 may be located in front of the support portion 813 and the bent portion 814.

Figure 8:
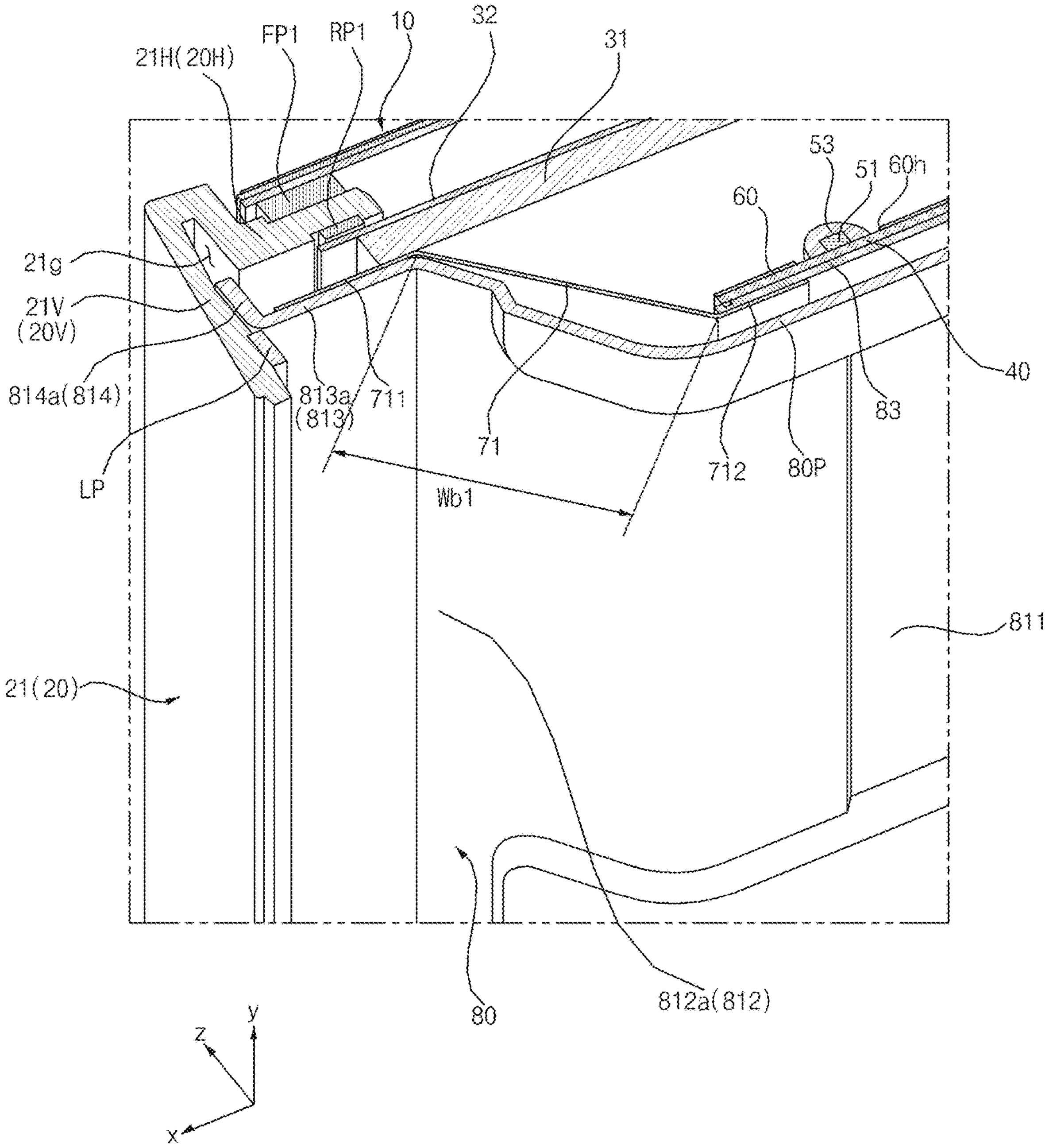

Referring to FIG. 8, a first part 21 of the guide panel 20 may be extended along the left side of the display panel 10. The first part 21 may include a first outer part 21V and a first inner part 21H.

The first outer part 21V may define a first short side SS1 (see FIG. 1) and may cover the left side of the display panel 10 and the left side of the frame 80. The first outer part 21V may be referred to as a first vertical part 21V.

The first inner part 21H may protrude to between the display panel 10 and the optical sheet 32 from the inner surface of the first outer part 21V. The first inner part 21H may be referred to as a first horizontal part 21H. A front pad FP1 may be located between the display panel 10 and the first inner part 21H, and may be coupled or attached to the display panel 10 and the first inner part 21H. A rear pad RP1 may be located between the first inner part 21H and the optical sheet 32, and may be coupled or attached to the first inner part 21H and/or the optical sheet 32. The pads FP1 and RP1 may be a double-sided tape.

The first inclined portion 812*a* may be obliquely bent in a forward direction from the left side of the flat portion 811. The angle between the first inclined portion 812*a* and the flat portion 811 may be an obtuse angle. A first support portion 813*a* may be bent horizontally from the distal end of the first inclined portion 812*a*. A first bent portion 814*a* may be bent in a forward direction from the distal end of the first support portion 813*a*, and may be inserted into a first groove 21*g* of the first part 21. The diffusion plate 31 and the optical sheet 32 may be located between the first inner part 21H and the first support portion 813*a*, and the first support portion 813*a* may support the diffusion plate 31.

A first side portion 71 may be extended along the left side of the reflective sheet 60, and the angle between the first side portion 71 and the reflective sheet 60 may be an obtuse angle. A first fixing portion 711 may be bent horizontally from the front end of the first side portion 71, and may be sandwiched between the diffusion plate 31 and the first support portion 813*a*. A first hooking portion 712 may be bent from the rear end of the first side portion 71 to between the heat dissipation plate 83 and the flat portion 811, and may be hooked to the rear surface of the heat dissipation plate 83.

Figure 9:
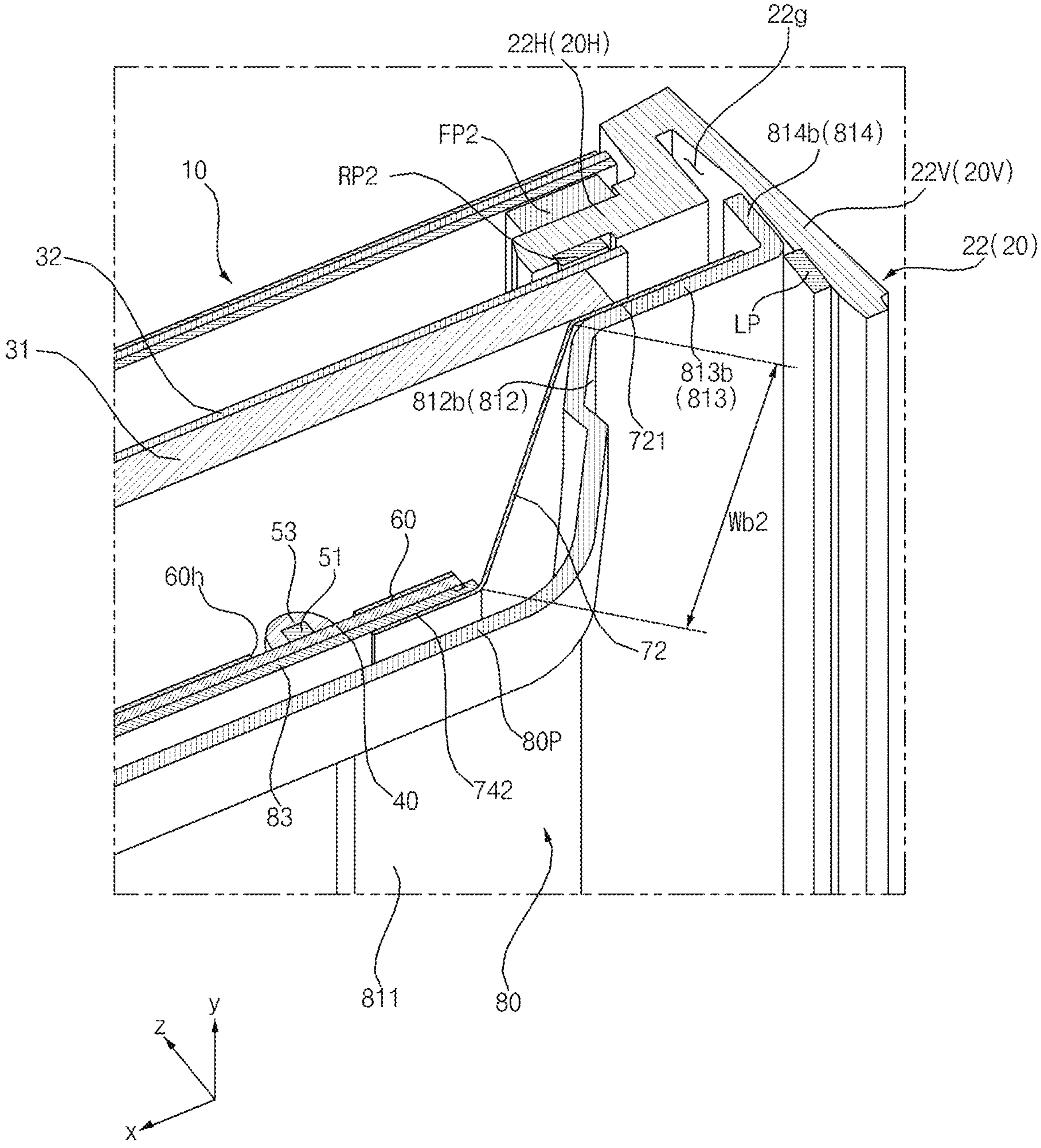

Referring to FIG. 9, a second part 22 of the guide panel 20 may be extended along the right side of the display panel 10. The second part 22 may include a second outer part 22V and a second inner part 22H.

The second outer part 22V may define a second short side SS2 (see FIG. 1), and may cover the right side of the display panel 10 and the right side of the frame 80. The second outer part 22V may be referred to as a second vertical part 22V.

The second inner part 22H may protrude from the inner surface of the second outer part 22V to between the display panel 10 and the optical sheet 32. The second inner part 22H may be referred to as a second horizontal part 22H. A front pad FP2 may be located between the display panel 10 and the second inner part 22H, and may be coupled or attached to the display panel 10 and the second inner part 22H. A rear pad RP2 may be located between the second inner part 22H and the optical sheet 32, and may be coupled or attached to the second inner part 22H and/or the optical sheet 32. The pads FP2, RP2 may be a double-sided tape.

A second inclined portion 812*b* may be bent obliquely in a forward direction from the right side of the flat portion 811. The angle between the second inclined portion 812*b* and the flat portion 811 may be an obtuse angle. A second support portion 813*b* may be bent horizontally from the distal end of the second inclined portion 812*b*. A second bent portion 814*b* may be bent in a forward direction from the distal end of the second support portion 813*b*, and may be inserted into a second groove 22*g* of the second part 22. The diffusion plate 31 and the optical sheet 32 may be located between the second inner part 22H and the second support portion 813*b*, and the second support portion 813*b* may support the diffusion plate 31.

A second side portion 72 may be extended along the right side of the reflective sheet 60, and the angle between the second side portion 72 and the reflective sheet 60 may be an obtuse angle. A second fixing portion 721 may be bent horizontally from the front end of the second side portion 72, and may be sandwiched between the diffusion plate 31 and the second support portion 813*b*. A second hooking portion 722 may be bent from the rear end of the second side portion 72 to between the heat dissipation plate 83 and the flat portion 811, and may be hooked to the rear surface of the heat dissipation plate 83.

Figure 10:
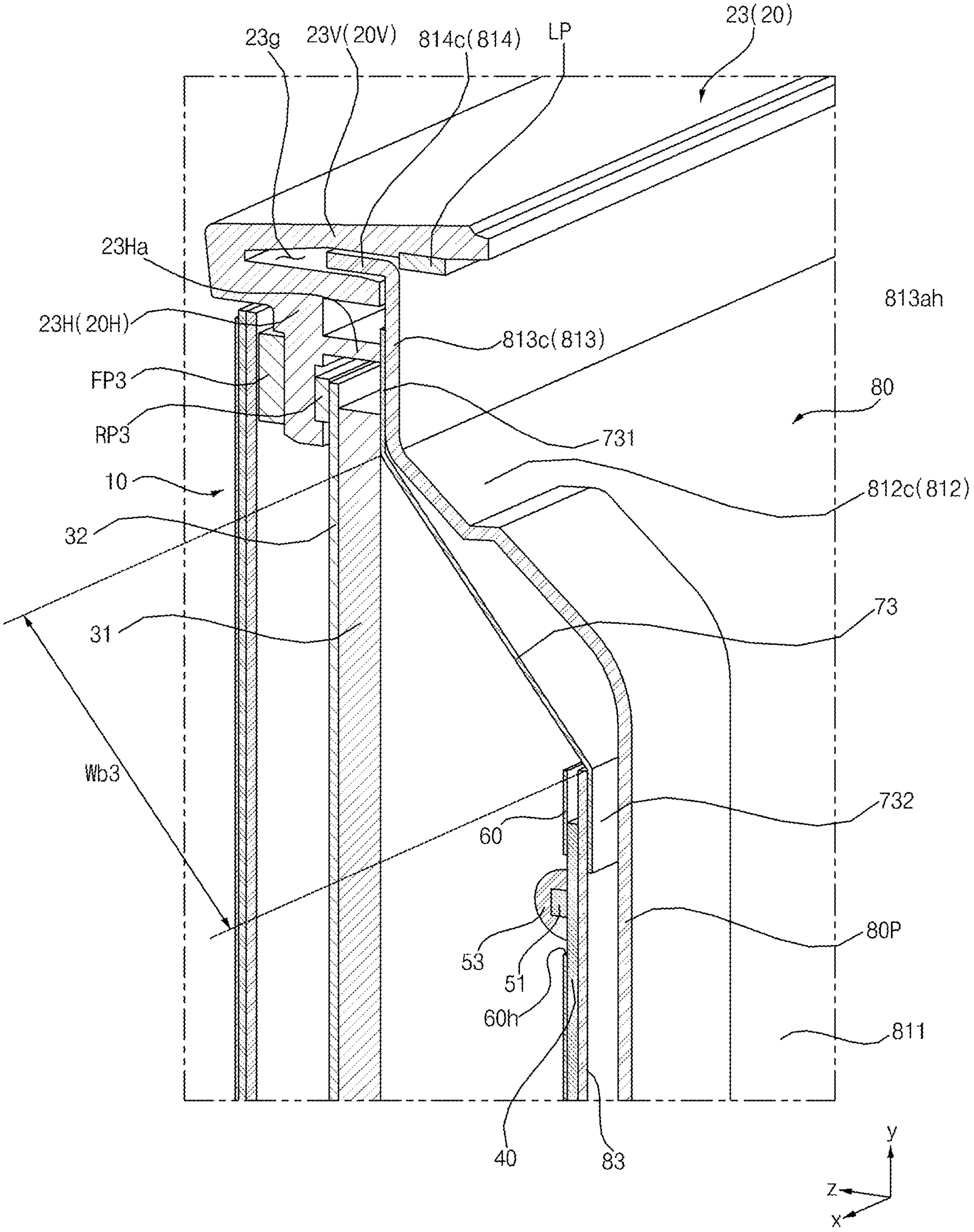

Referring to FIG. 10, a third part 23 of the guide panel 20 may be extended along the upper side of the display panel 10. The third part 23 may include a third outer part 23V and a third inner part 23H.

The third outer part 23V may define a first long side LS1 (see FIG. 1), and may cover the upper side of the display panel 10 and the upper side of the frame 80. The third outer part 23V may be referred to as a third vertical part 23V.

The third inner part 23H may protrude from the inner surface of the third outer part 23V to between the display panel 10 and the optical sheet 32. The third inner part 23H may be referred to as a third horizontal part 23H. A front pad FP3 may be located between the display panel 10 and the third inner part 23H, and may be coupled or attached to the display panel 10 and the third inner part 23H. A rear pad RP3 may be located between the third inner part 23H and the optical sheet 32, and may be coupled or attached to the third inner part 23H and/or the optical sheet 32. The pads FP3, RP3 may be a double-sided tape.

A third inclined portion 812*c* may be bent obliquely in a forward direction from the upper side of the flat portion 811. The angle between the third inclined portion 812*c* and the flat portion 811 may be an obtuse angle. A third support portion 813*c* may be bent horizontally from the distal end of the third inclined portion 812*c*. A third bent portion 814*c* may be bent in a forward direction from the distal end of the third support portion 813*c*, and may be inserted into a third groove 23*g* of the third part 23. The diffusion plate 31 and the optical sheet 32 may be located between the third inner part 23H and the third support portion 813*c*, and the third support portion 813*c* may support the diffusion plate 31.

A third side portion 73 may be extended along the upper side of the reflective sheet 60, and the angle between the third side portion 73 and the reflective sheet 60 may be an obtuse angle. A third fixing portion 731 may be bent horizontally from the front end of the third side portion 73, and may be sandwiched between the diffusion plate 31 and the third support portion 813*c*. A third hooking portion 732 may be bent from the rear end of the third side portion 73 to between the heat dissipation plate 83 and the flat portion 811, and may be hooked to the rear surface of the heat dissipation plate 83.

Figure 11:
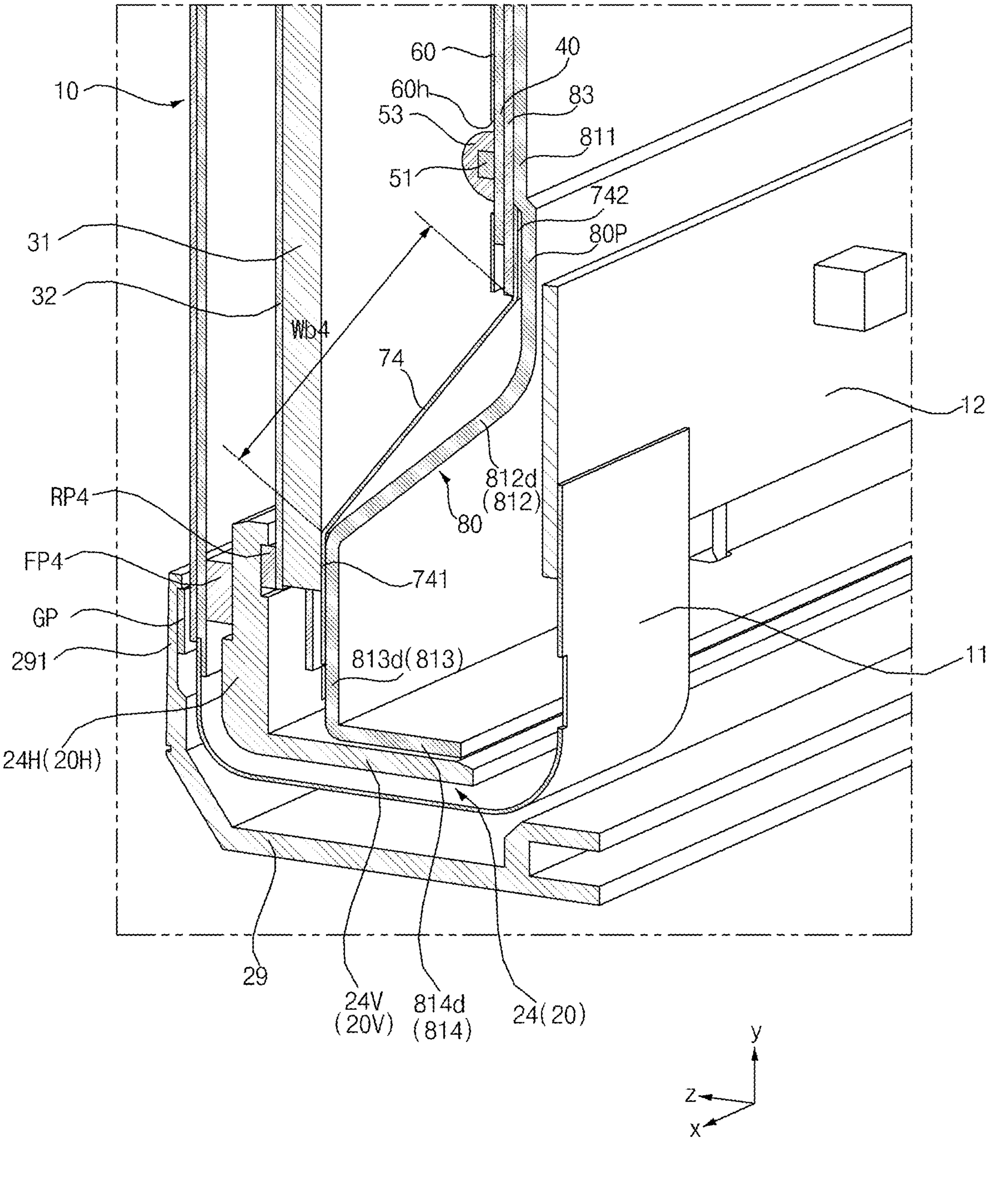

Referring to FIG. 11, a fourth part 24 of the guide panel 20 may be extended along the lower side of the display panel 10. The fourth part 24 may include a fourth outer part 24V and a fourth inner part 24H.

The fourth outer part 24V may define a second long side LS2 (see FIG. 1) and cover the lower side of the frame 80. The fourth outer part 24V may be referred to as a fourth vertical part 24V.

The fourth inner part 24H may protrude from the inner surface of the fourth outer part 24V to between the display panel 10 and the optical sheet 32. The fourth inner part 24H may be referred to as a fourth horizontal part 24H. A front pad FP4 may be located between the display panel 10 and the fourth inner part 24H, and may be coupled or attached to the display panel 10 and the fourth inner part 24H. A rear pad RP4 may be located between the fourth inner part 24H and the optical sheet 32, and may be coupled or attached to the fourth inner part 24H and/or the optical sheet 32. The pads FP4, RP4 may be a double-sided tape.

A fourth inclined portion 812*d* may be bent obliquely in a forward direction from the lower side of the flat portion 811. The angle between the fourth inclined portion 812*d* and the flat portion 811 may be an obtuse angle. A fourth support portion 813*d* may be bent horizontally from the distal end of the fourth inclined portion 812*d*. A fourth bent portion 814*d* may be bent in a rearward direction from the distal end of the fourth support portion 813*d*, and may be located on the fourth outer part 24V. The diffusion plate 31 and the optical sheet 32 may be located between the fourth inner part 24H and the fourth support portion 813*d*, and the fourth support portion 813*d* may support the diffusion plate 31.

A fourth side portion 74 may be extended along the lower side of the reflective sheet 60, and the angle between the fourth side portion 74 and the reflective sheet 60 may be an obtuse angle. A fourth fixing portion 741 may be bent horizontally from the front end of the fourth side portion 74, and may be sandwiched between the diffusion plate 31 and the fourth support portion 813*d*. A fourth hooking portion 742 may be bent from the rear end of the fourth side portion 74 to between the heat dissipation plate 83 and the flat portion 811, and may be hooked to the rear surface of the heat dissipation plate 83.

Meanwhile, a bottom cover 29 may cover the lower side of the display panel 10 and the lower surface of the fourth outer part 24V. One end of the cable 11 may be electrically connected to the display panel 10 while being adjacent to the lower side of the display panel 10, and the other end of the cable 11 may be electrically connected to the source PCB 12 coupled to the rear of the frame 80. A part of the cable 11 may be located between the fourth part 24 and the bottom cover 29. The gap pad (GP) may be coupled or attached to the rear surface of the front part 291 of the bottom cover 29 and the front surface of the display panel 10.

Figure 12:
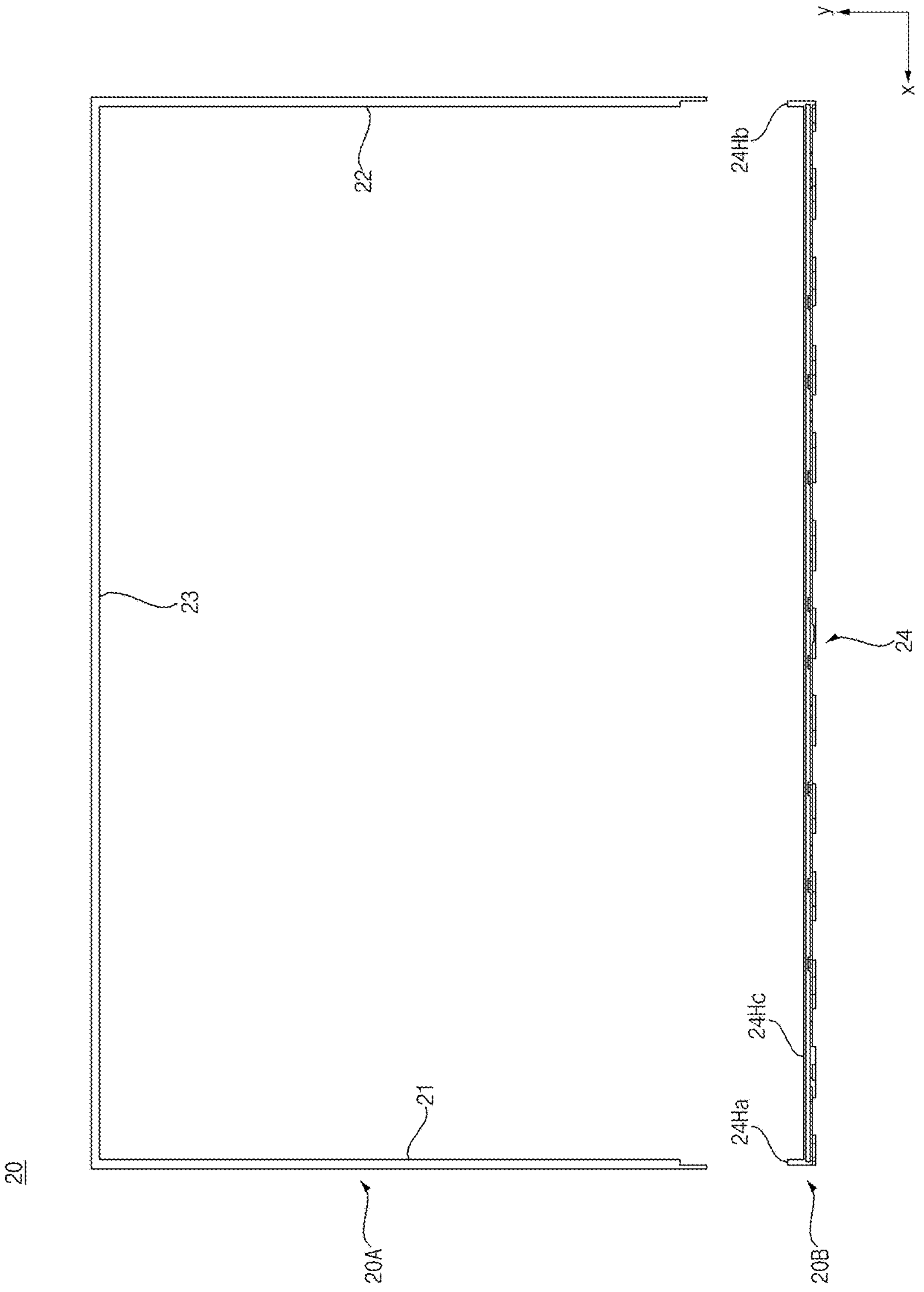
Figure 13:
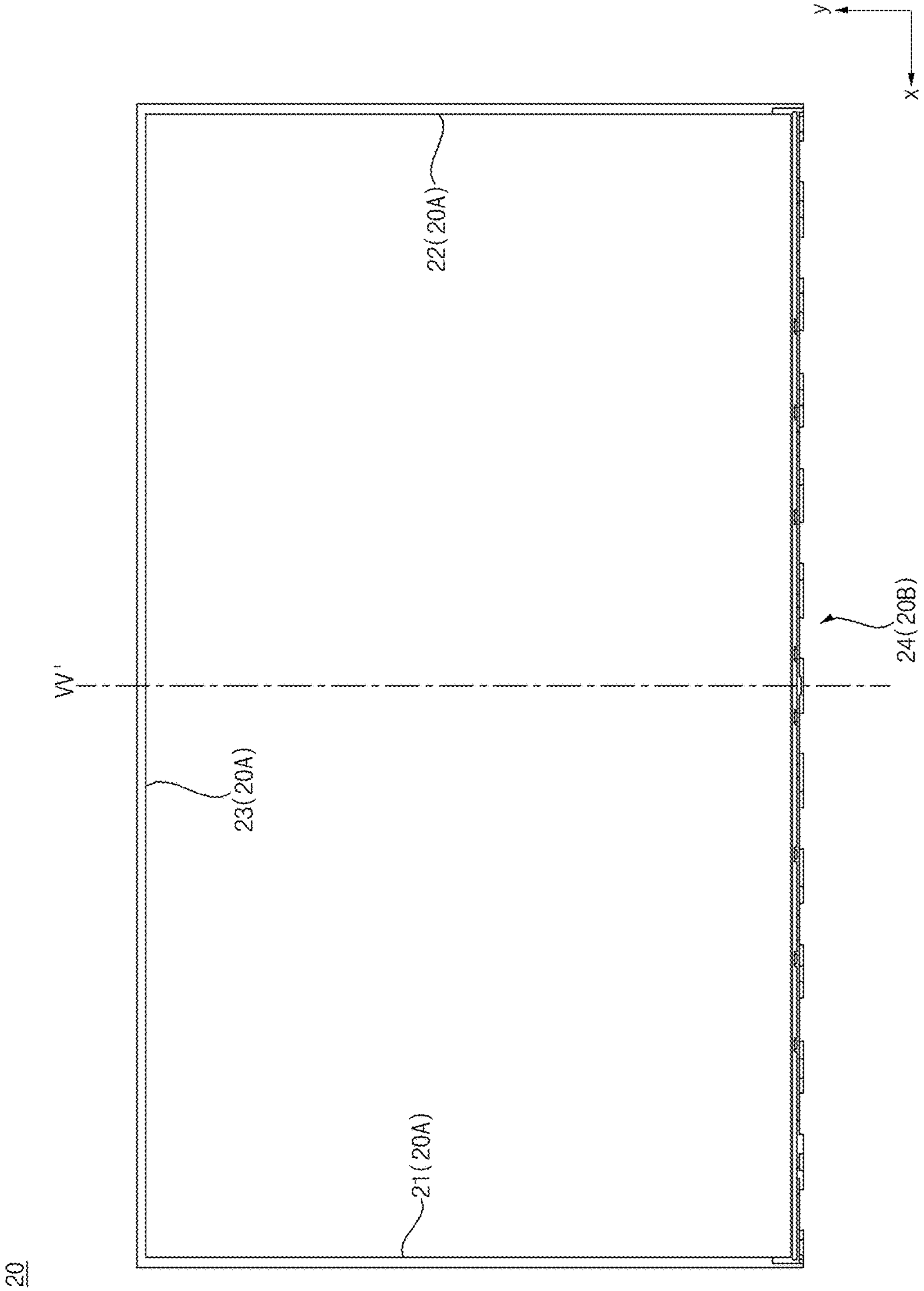

Referring to FIGS. 12 and 13, the guide panel 20 may include a first guide panel 20A and a second guide panel 20B.

The first guide panel 20A may be extended along one side of the display panel 10 (see FIG. 1). The first guide panel 20A may include a first part 21, a second part 22, and a third part 23. The first part 21 may be extended vertically, and form a first short side (i.e., the first short side SS1 of FIG. 1) of the guide panel 20. The second part 22 may be extended, in opposite to the first part 21, along the longitudinal direction of the first part 21 and form a second short side (i.e., the second short side SS2 of FIG. 1) of the guide panel 20. The third part 23 may be extended in a direction intersecting with the first part 21 and the second part 22, connect the first part 21 and the second part 22, and form the first long side (i.e., the first long side LS1 of FIG. 1) of the guide panel 20. The first guide panel 20A may have a U shape as a whole. The first guide panel 20A may be referred to as a guide panel top 20A or a top guide panel 20A.

The second guide panel 20B may be extended along the other side of the display panel 10 (see FIG. 1). The second guide panel 20B may be a fourth part 24. The fourth part 24 may be extended, in opposite to the third part 23 of the first guide panel 20A, along the longitudinal direction of the third part 23, and may form the second long side (i.e., the second long side LS2 of FIG. 1) of the guide panel 20. The second guide panel 20B may have an overall square bracket shape. The second guide panel 20B may be referred to as a guide panel bottom 20B or a bottom guide panel 20B.

The second guide panel 20B may be detachably coupled to the first guide panel 20A. In this case, the second guide panel 20B may connect the first part 21 and the second part 22 of the first guide panel 20A. The guide panel 20 may be symmetrical from side to side with respect to a reference line VV' that extends vertically through the center of the guide panel 20. The coupling structure of the second guide panel 20B and the first part 21 described below may be identically applied to the coupling structure of the second guide panel 20B and the second part 22.

Figure 14:
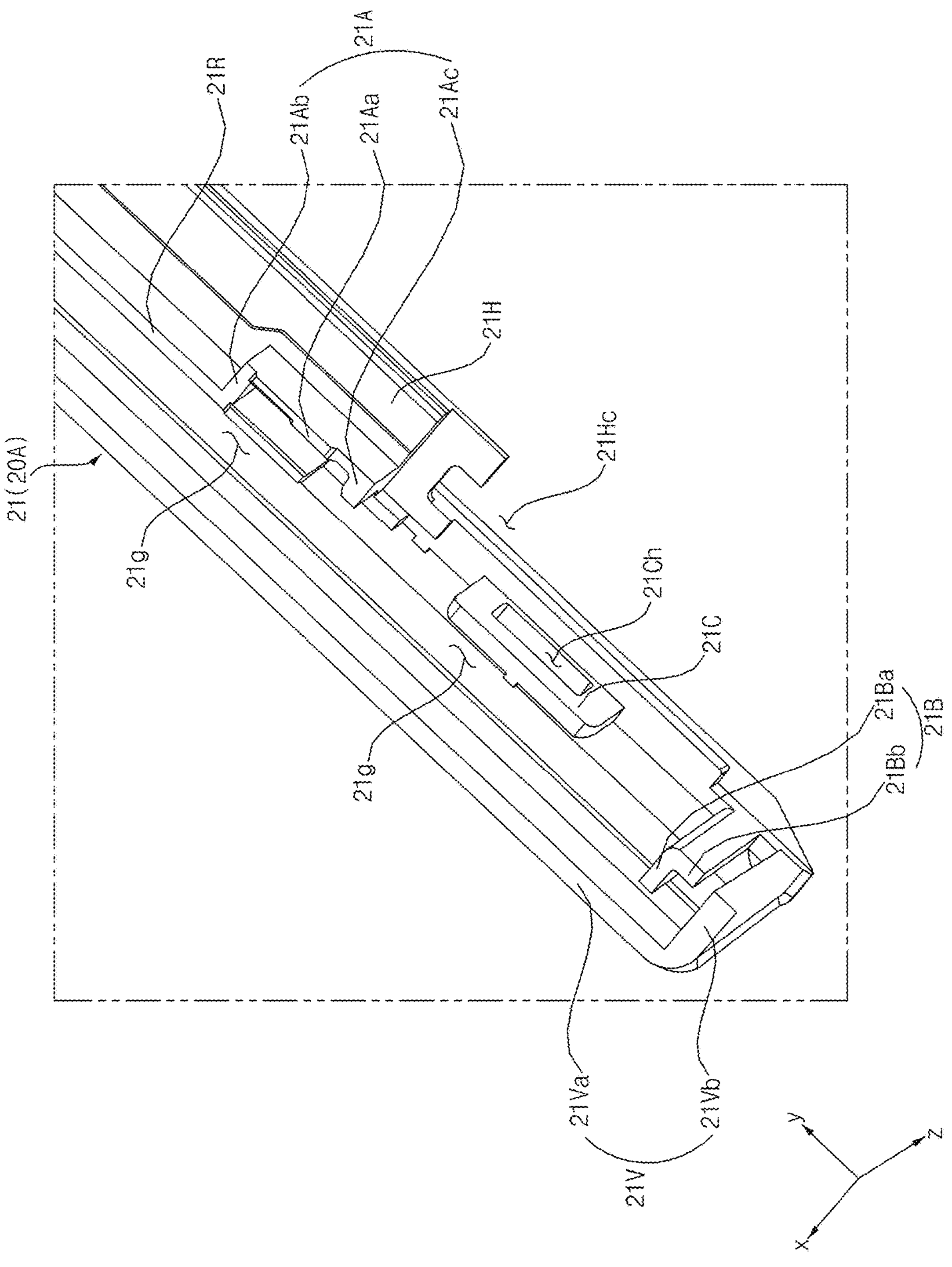
Figure 15:
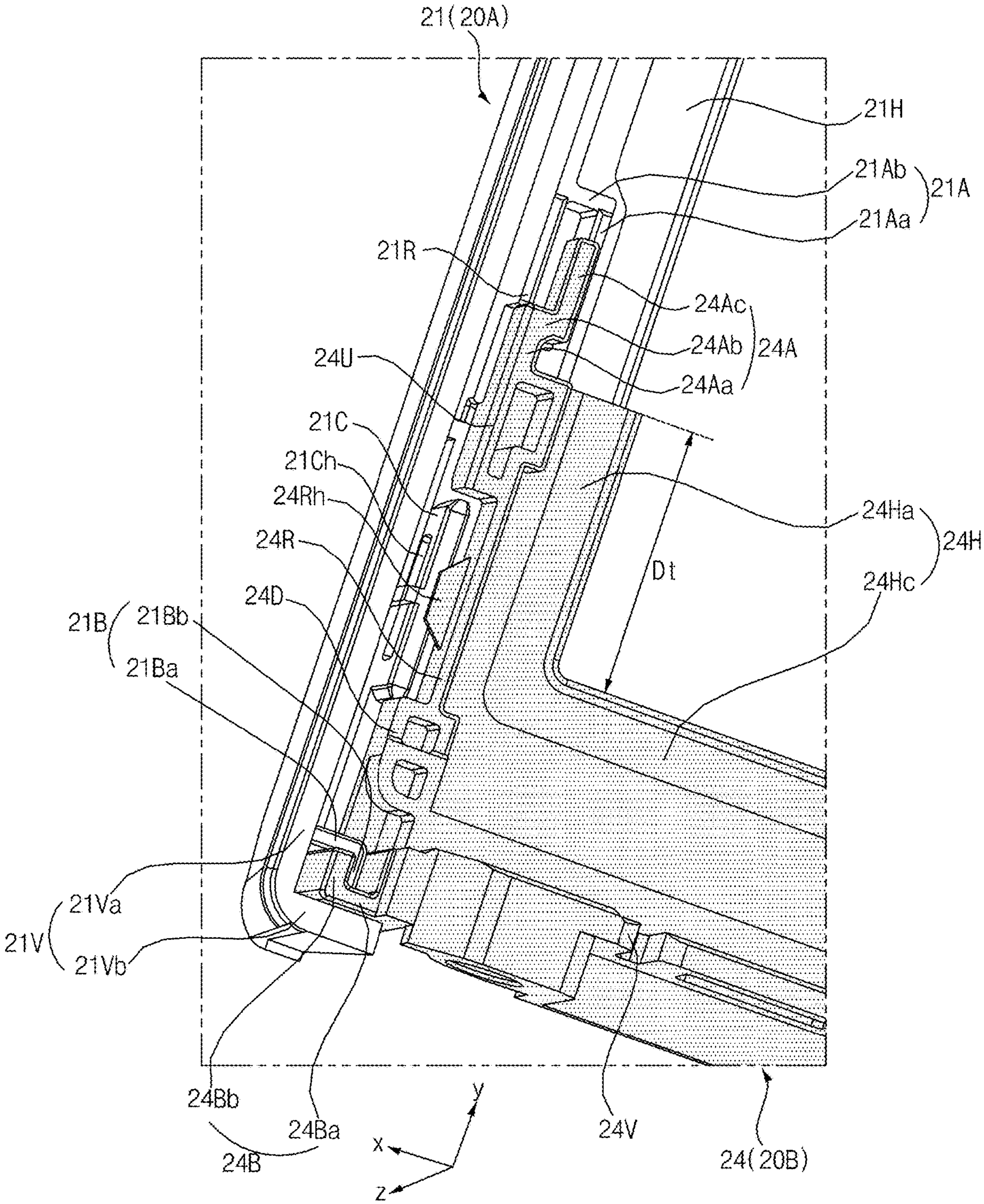
Figure 16:
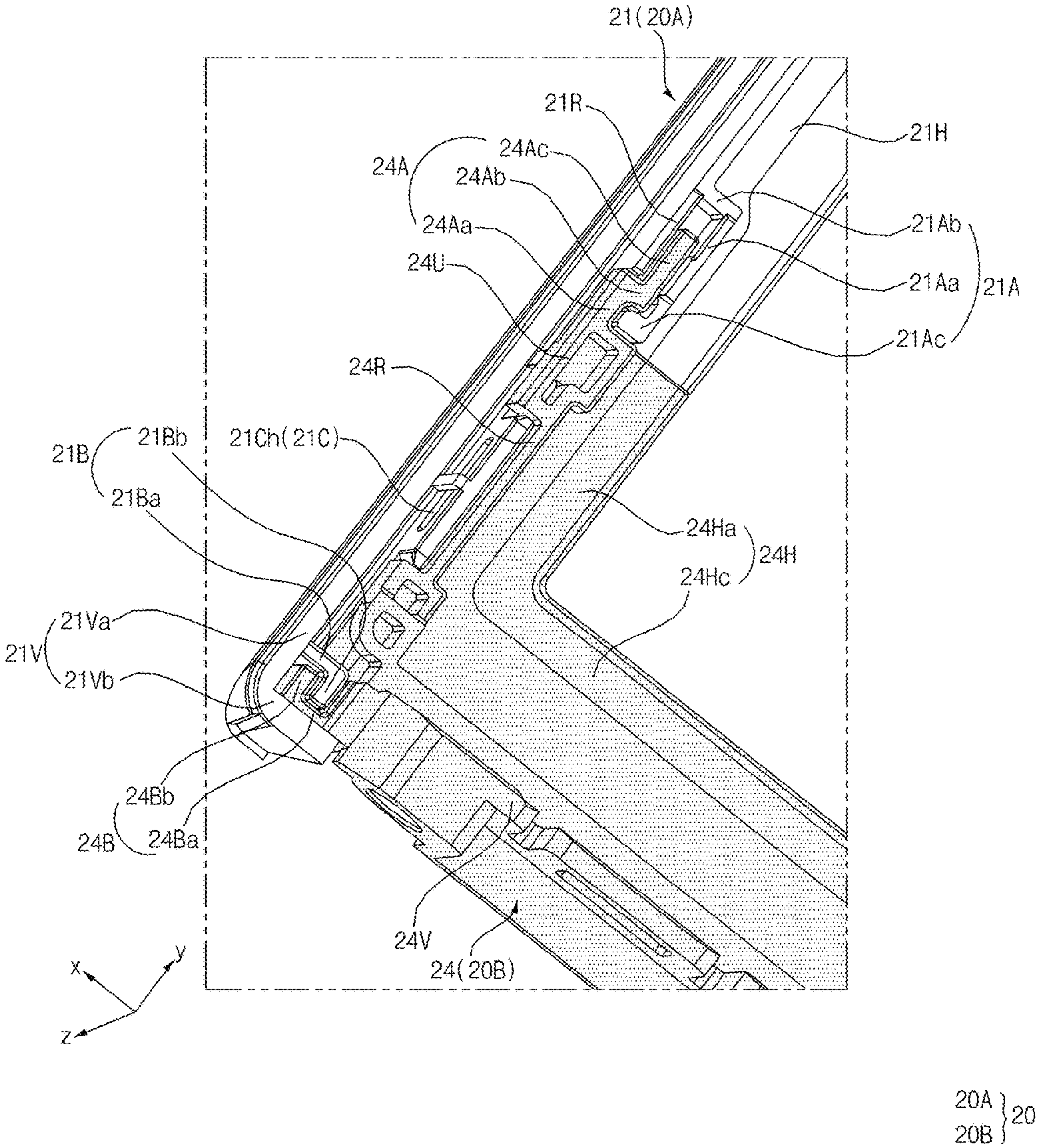
Figure 17:
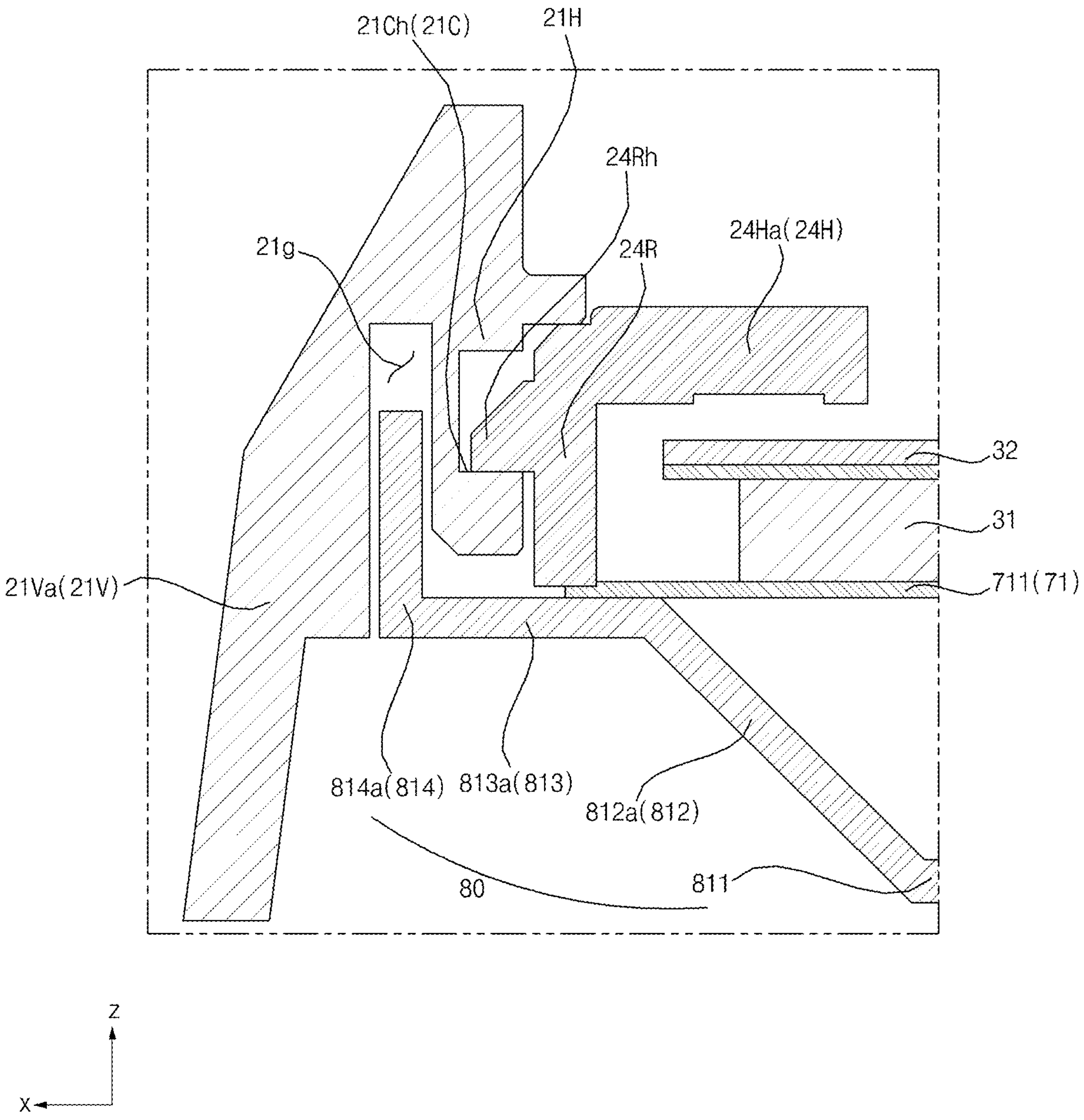
Figure 18:
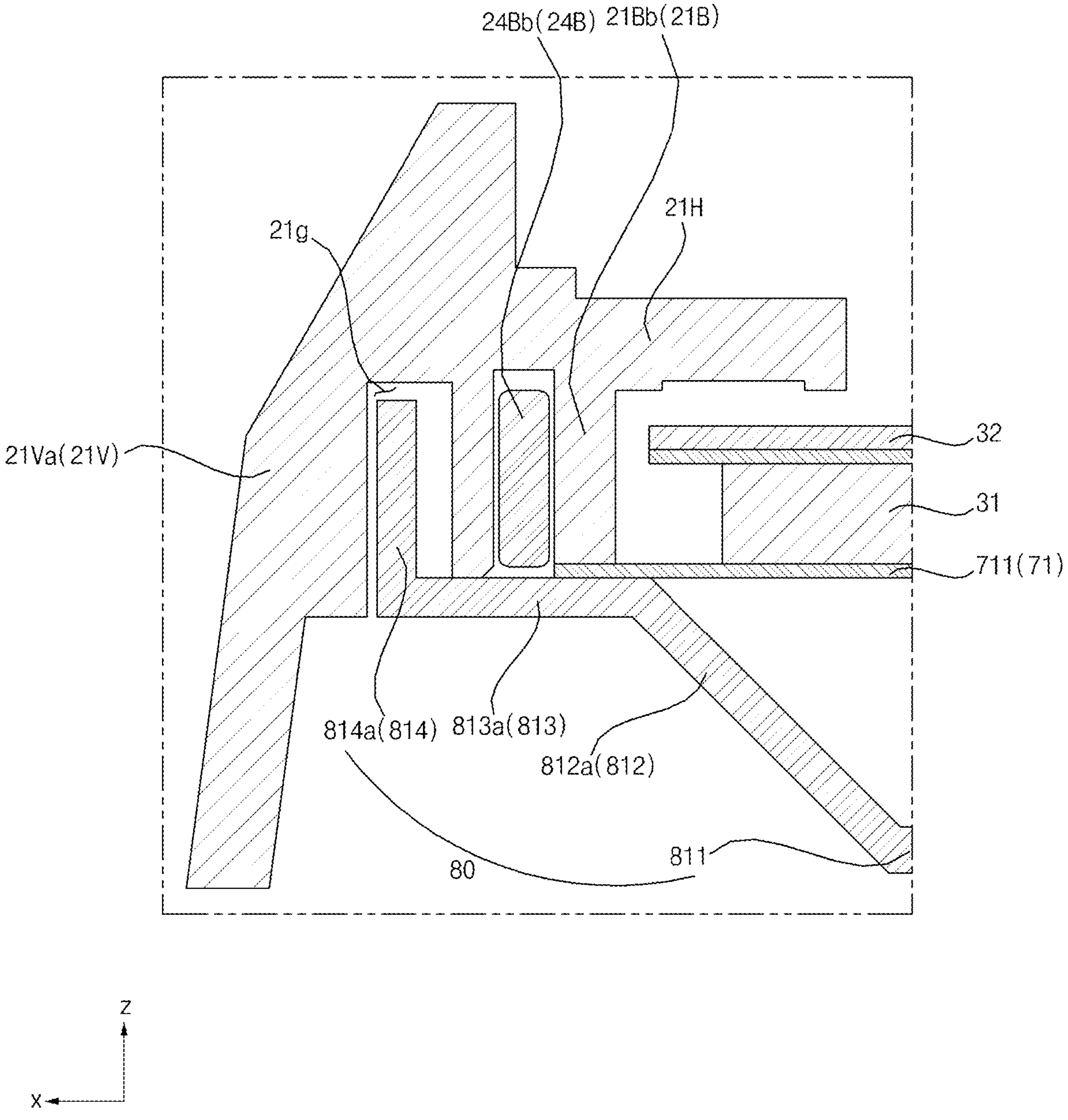

Referring to FIG. 14, the first part 21 of the first guide panel 20A may include a first outer part 21V, a first inner part 21H, a rib 21R, a first wall 21A, a second wall 21B, and a coupling portion 21C.

The first outer part 21V may form an outer surface (i.e., a left surface) of the first part 21. The first outer part 21V may include a side part 21Va that extends vertically and a bottom part 21Vb that is bent in a direction intersecting with the side part 21Va from the lower end of the side part 21Va.

The first inner part 21H may protrude from the inner surface of the first outer part 21V in a direction intersecting with the first outer part 21V, and may be extended along the longitudinal direction of the first outer part 21V. A cut-out 21Hc may be formed by cutting out a portion of the first inner part 21H. The cut-out 21Hc may be formed at the lower portion of the first inner part 21H. The cut-out 21Hc may be referred to as a notch 21Hc or a groove 21Hc.

The rib 21R may protrude from the rear surface of the first inner part 21Hk, and may be extended along the longitudinal direction of the first inner part 21H. The rib 21R may be opposite to the side part 21Va of the first outer part 21V. The length of the rib 21R in the up-down direction may be smaller than the length of the first outer part 21V, and the width of the rib 21R in the front-rear direction may be smaller than the width of the first outer part 21V. The lower end of the rib 21R may be adjacent to the upper end of the cut-out 21Hc.

The first wall 21A may be referred to as an upper wall 21A. The first wall 21A may be opposite to the side part 21Va of the first outer part 21V with respect to the rib 21R, and may protrude from the rear surface of the first inner part 21H. One end of the first wall 21A may be connected to the rib 21R, and the other end of the first wall 21B may be spaced apart from the lower end of the rib 21R while being adjacent to the lower end of the rib 21R. The first wall 21A may have an overall square bracket shape. The first wall 21A may include a center part 21Aa, an upper part 21Ab, and a lower part 21Ac.

The center part 21Aa may face the rib 21R and be extended along the rib 21R. The lower end of the center part 21Aa may be located lower than the lower end of the rib 21R. The upper part 21Ab may be bent from the upper end of the center part 21Aa toward the rib 21R and may be connected to the rib 21R. The lower part 21Ac may be bent in the same direction as the upper part 21Ab from the lower end of the center part 21Aa, and may be spaced apart from the lower end of the rib 21R. For the part 21Aa, the protrusion height of the lower part 21Ac may be the same as the protrusion height of the upper part 21Ab.

The second wall 21B may be referred to as a lower wall 21B. The second wall 21B may be adjacent to the bottom part 21Vb of the first outer part 21V, and may protrude from the rear surface of the first inner part 21H. The second wall 21B may have a curved shape. The second wall 21B may have an L shape overall. The second wall 21B may include a horizontal part 21Ba and a vertical part 21Bb. The horizontal part 21Ba may be extended in a direction intersecting with the side part 21Va of the first outer part 21V. The horizontal part 21Ba may be parallel to and opposite to the bottom part 21Vb of the first outer part 21V. The vertical part 21Bb may be bent in a direction intersecting with the horizontal part 21Ba from the horizontal part 21Ba, and be opposite to the side part 21Va.

The coupling portion 21C may be located between the rib 21R and the second wall 21B. The coupling portion 21C may be spaced downward from the rib 21R, and spaced upward from the second wall 21B. The rib 21R, the coupling portion 21C, and the second wall 21B may be aligned vertically. The coupling portion 21C may protrude from the rear surface of the first inner part 21H. The coupling portion 21C may be extended vertically. A coupling hole 21Ch may be formed by penetrating the coupling portion 21C. The coupling hole 21Ch may be a vertically elongated hole. The coupling hole 21Ch may be referred to as a hook groove 21Ch or a latch groove 21Ch.

The first groove 21*g* may be formed between the rib 21R and the side part 21Va of the first outer part 21V. The first groove 21*g* may be formed between the coupling portion 21C and the side part 21Va of the first outer part 21V.

The first outer part 21V, the first inner part 21H, the rib 21R, the first wall 21A, the second wall 21B, and the coupling portion 21C of the first part 21 of the first guide panel 20A described above and below may be symmetrically applied to the second part 22 (see FIG. 13) of the first guide panel 20A. That is, each of the second outer part 22V, the second inner part 22H, the rib 22R, the first wall 22A, the second wall 22B, and the coupling portion 22C of the second part 22 may be symmetrically applied to each of the first outer part 21V, the first inner part 21H, the rib 21R, the first wall 21A, the second wall 21B, and the coupling portion 21C of the first part 21 (see FIGS. 14 and 22).

Referring to FIGS. 15 to 18, the fourth part 24 forming the second guide panel 20B may include a fourth outer part 24V, a fourth inner part 24H, a coupling rib 24R, a first block 24U, a second block 24D, a first hooking portion 24A, and a second hooking portion 24B. The fourth outer part 24V may form an outer surface (i.e., a lower surface) of the fourth part 24. The fourth outer part 24V may be extended in a left-right direction.

The fourth inner part 24H may protrude from the inner surface of the fourth outer part 24V in a direction intersecting with the fourth outer part 24V, and may be extended along the longitudinal direction of the fourth outer part 24V. The fourth inner part 24H may include an extension part 24Hc that extends in the left-right direction, a first protruding part 24Ha (see Dt of FIG. 15) that protrudes upward from one end (i.e., the left end) of the extension part 24Hc, and a second protruding part 24Hb (see FIG. 12) that protrudes upward from the other end (i.e., the right end) of the extension part 24Hc. The first protruding part 24Ha may be located in the cut-out 21Hc of the first part 21, and the second protruding part 24Hb may be located in the cut-out of the second part 22.

The coupling rib 24R may protrude from the rear surface of the extension part 24Hc and/or the rear surface of the first protruding part 24Ha while being adjacent to one end (i.e., the left distal end) of the extension part 24Hc. At least a portion of the coupling rib 24R may be formed in the first protruding part 24Ha. The coupling rib 24R may face the coupling portion 21C, and may extend in the longitudinal direction of the coupling portion 21C, i.e., in the vertical direction. The outer surface of the coupling rib 24R may face the inner surface of the coupling portion 21C. A hook 24Rh may be formed on the outer surface of the coupling rib 24R. The hook 24Rh may be hooked to the coupling hole 21Ch of the coupling portion 21C.

The first block 24U may be formed in one end (i.e., the upper end) of the coupling rib 24R, and may have a thickness greater than that of the coupling rib 24R. The first block 24U may protrude further outward than the coupling rib 24R. The first block 24U may be located between the upper end of the coupling portion 21C and the lower part 21Ac of the first wall 21A.

The second block 24D may be formed in the other end (i.e., the lower end) of the coupling rib 24R, and may have a thickness greater than the thickness of the coupling rib 24R. The second block 24D may protrude further outward than the coupling rib 24R. The second block 24D may be located between the lower end of the coupling portion 21C and the horizontal part 21Ba of the second wall 21B.

The first hooking portion 24A may be formed in the first block 24U. A first protrusion 24Aa of the first hooking portion 24A may protrude from the upper side of the first block 24U toward the lower end of the rib 21R. A second protrusion 24Ab of the first hooking portion 24A may protrude from the first protrusion 24Aa toward the center part 21Aa of the first wall 21A. A third protrusion 24Ac of the first hooking portion 24A may protrude from the second protrusion 24Ab toward the upper part 21Ab of the first wall 21A. The first hooking portion 24A may be inserted into a space between the rib 21R and the first wall 21A and hooked thereto.

The second hooking portion 24B may be formed on the fourth outer part 24V. The first protrusion 24Ba of the second hooking portion 24B may protrude from the left side of the fourth outer part 24V toward a portion between the vertical part 21Bb of the second wall 21B and the bottom part 21Bb of the first outer part 21V. The second protrusion 24Bb of the second hooking portion 24B may protrude from the first protrusion 24Ba toward the horizontal part 21Ba of the second wall 21B. The second hooking portion 24B may be inserted into a space between the second wall 21B and the bottom part 21Bb and hooked thereto.

Accordingly, the fourth part 24 may be coupled to the first part 21. The coupling structure of the coupling hole 21Ch and the hook 24Rh may restrict the front-rear movement of the fourth part 24. The coupling structure of the first hooking portion 24A may restrict the up-down and left-right movement of the fourth part 24. The coupling structure of the second hooking portion 24B may restrict the up-down and left-right movement of the fourth part 24.

The coupling rib 24R, the first block 24U, the second block 24D, the first hooking portion 24A, and the second hooking portion 24B formed adjacent to the first protrusion 24Ha described above and below may be formed symmetrically adjacent to the second protrusion 24Hb (see FIG. 12). That is, each of the coupling rib 24R, the first block 24U, the second block 24D, the first hooking portion 24A, and the second hooking portion 24B formed adjacent to the second protrusion 24Hb may be symmetrical to each of the coupling rib 24R, the first block 24U, the second block 24D, the first hooking portion 24A, and the second hooking portion 24B formed adjacent to the first protrusion 24Ha (see FIGS. 15 and 22). Accordingly, the fourth part 24 may be detachably coupled to the first part 21 and the second part 22.

Figure 19:
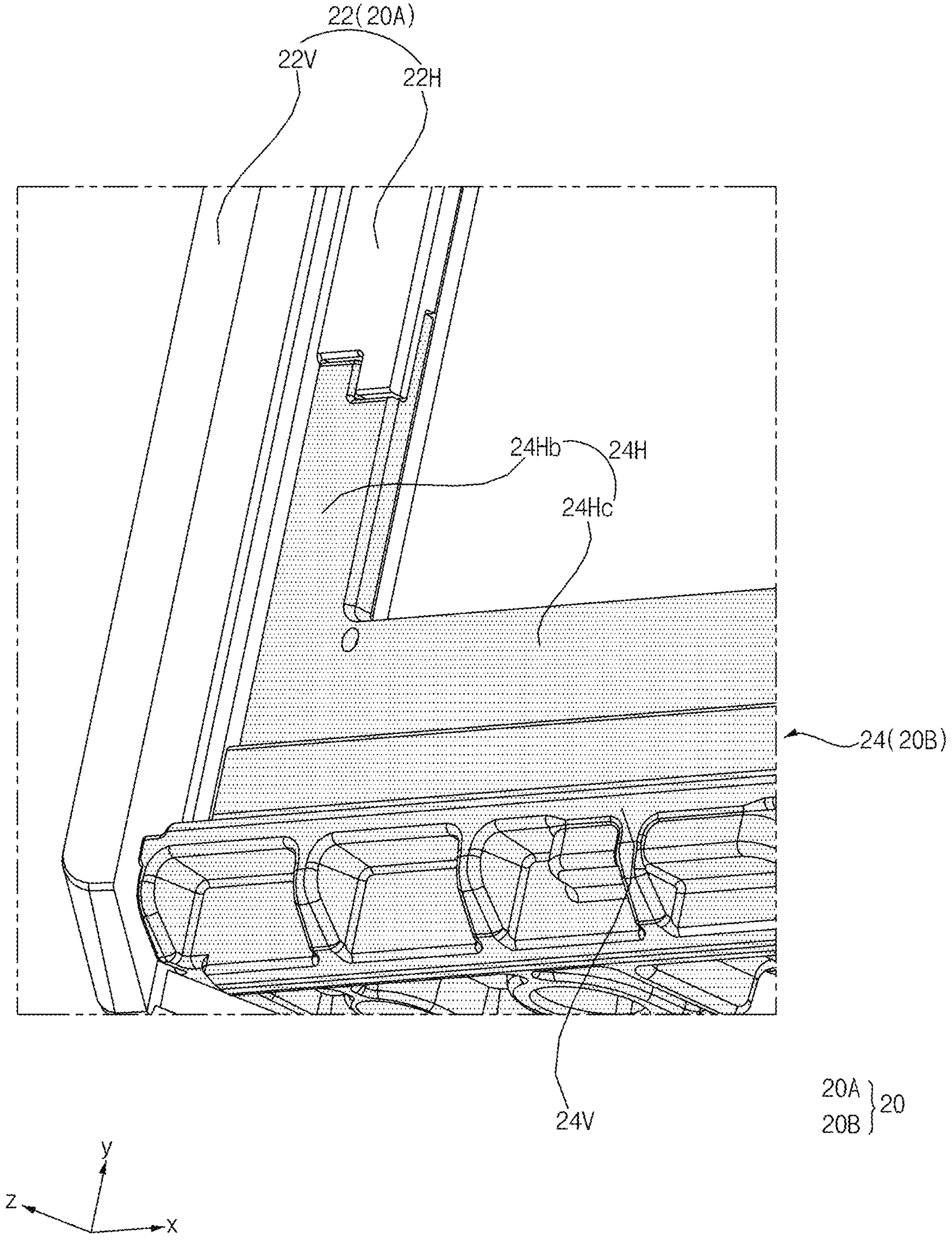

Referring to FIG. 19, the front surface of the second inner part 22H of the first guide panel 20A may be located at the same height as the front surface of the fourth inner part 24H of the second guide panel 20B. Similarly, the front surfaces of the remaining inner parts 21H and 23H (see FIGS. 8 and 10) of the first guide panel 20A may be located at the same height as the front surface of the fourth inner part 24H of the second guide panel 20B.

Accordingly, it is possible to prevent a portion of the display panel 10 located on the inner parts 21H, 22H, 23H, and 24H of the guide panel 20 from protruding forward more than the other portions (see FIGS. 8 to 11).

Referring again to FIG. 3, the optical layer OL may include a diffusion plate 31 and a light source 51 that provides light to the rear surface of the diffusion plate 31. The light source 51 may be mounted on a substrate 40 in a rear of the diffusion plate 31. The optical layer OL may be referred to as a direct type optical layer OL.

Referring again to FIG. 4, the optical layer OL' may include a light guide plate 33 and a light source 51' that provides light to the lateral side of the light guide plate 33. The light source 51' may be mounted on a substrate 40' below the light guide plate 33. The optical layer OL' may be referred to as an edge type optical layer OL'.

Figure 20:
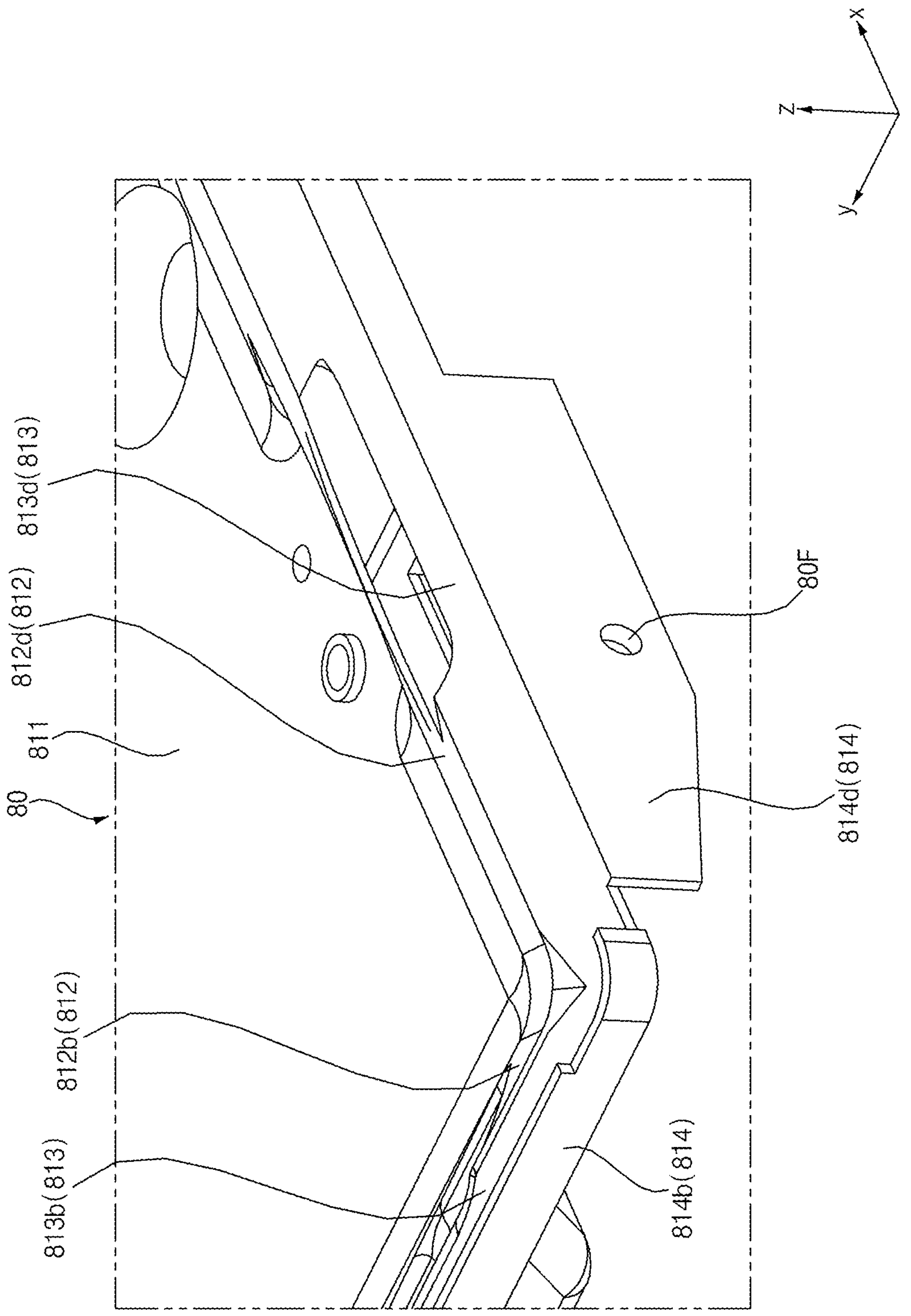
Figure 21:
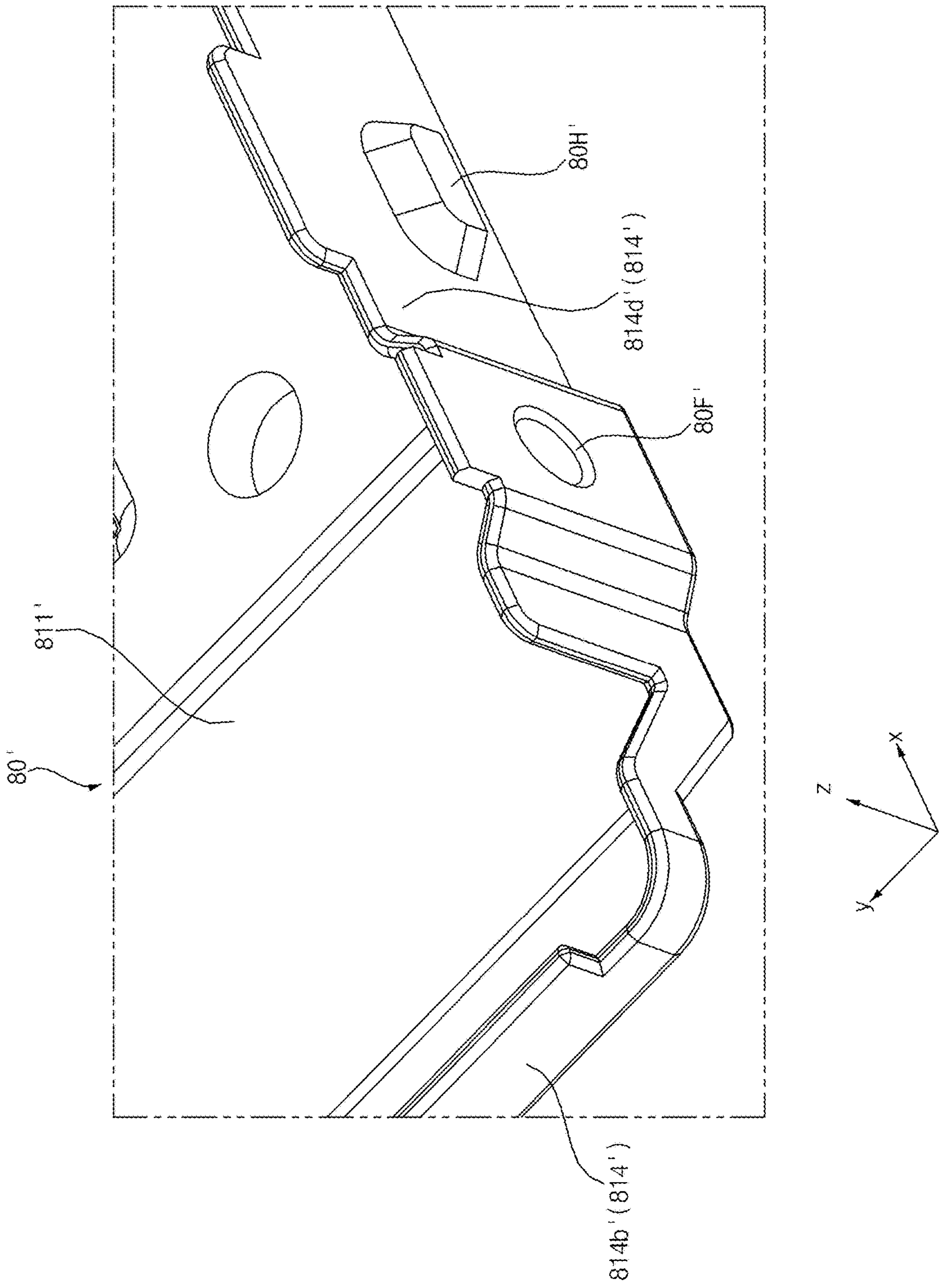
Figure 22:
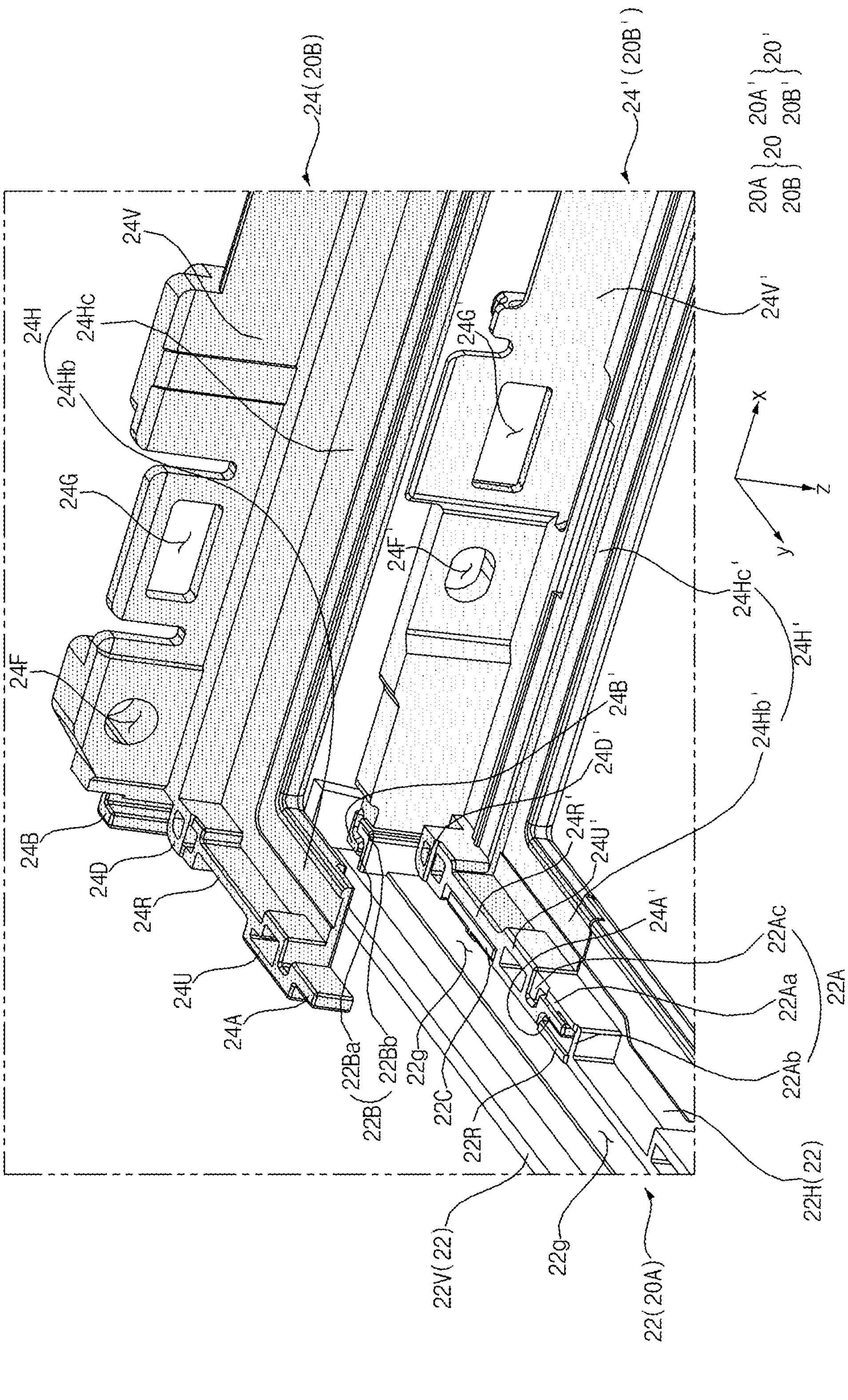

Referring to FIGS. 20 to 22, the direct type optical layer OL (see FIG. 3) may be mounted on the frame 80 (see FIG. 20), and the edge type optical layer OL' (see FIG. 4) may be mounted on a frame 80' (see FIG. 21). The frame 80 may be referred to as a direct type frame 80, and the frame 80' may be referred to as an edge type frame 80'.

The support portion 813 of the frame 80 may support the diffusion plate 31 of the optical layer OL. The flat portion 811 of the frame 80 may form a step that is lowered in a rearward direction from the support portion 813. The first to third bent portions 814*a*, 814*b*, and 814*c* may be bent in a forward direction from the distal end of the support portion 813. The fourth bent portion 814*d* may be bent in a rearward direction from the distal end of the support portion 813.

A flat portion 811' of the frame 80' may be flat overall and may support the light guide plate 33 of the optical layer OL'. A bent portion 814' of the frame 80' may be bent in a forward direction from the circumference of the rectangular flat portion 811'. A first bent portion may be bent in a forward direction from the left side of the flat portion 811', and a second bent portion 814*b'* may be bent in a forward direction from the right side of the flat portion 811'. A third bent portion may be bent in a forward direction from the upper side of the flat portion 811', and a fourth bent portion 814*d'* may be bent in a forward direction from the lower side of the flat portion 811'. The substrate 40' (see FIG. 4) may be extended along the lower side of the light guide plate 33, and light sources 51' that provide light to the lower side of the light guide plate 33 may be mounted on the substrate 40'. The substrate 40' may be mounted on the inner surface (i.e., the upper surface) of the fourth bent portion 814*d'*.

The second guide panel 20B (see FIG. 22) may be coupled to the first guide panel 20A.

In this case, the first to third bent portions 814*a*, 814*b*, and 814*c* of the frame 80 may be inserted into the first to third grooves 21*g*, 22*g*, and 23*g* of the first guide panel 20A (see FIGS. 8 to 10). In addition, the fourth bent portion 814*d* of the frame 80 may be located on the fourth outer part 24V. For example, the first to third bent portions 814*a*, 814*b*, and 814*c* may be hook-connected to the first guide panel 20A, and the fourth bent portion 814*d* may be hook-connected to the groove 24G of the second guide panel 20B. Furthermore, a fastening member such as a screw may be fastened to the hole 80F of the fourth bent portion 814*d* through the hole 24F of the second guide panel 20B. The second guide panel 20B may be referred to as a direct-type guide panel 20B.

A second guide panel 20B' (see FIG. 22) may be connected to the first guide panel 20A. The second guide panel 20B' may have a structure and shape corresponding to the structure and shape of the second guide panel 20B. Each of a fourth outer part 24V', a fourth inner part 24H', a coupling rib 24R', a first block 24U', a second block 24D', a first hooking portion 24A', and a second hooking portion 24B' of the second guide panel 20B' may correspond to each of the fourth outer part 24V, the fourth inner part 24H, the coupling rib 24R, the first block 24U, the second block 24D, the first hooking portion 24A, and the second hooking portion 24B of the second guide panel 20B. However, as illustrated in FIG. 22, the shape, location, or number of the components of the second guide panel 20B' may be slightly different from the shape, location, or number of the components of the second guide panel 20B. That is, the second guide panel 20B' may also be coupled to the first guide panel 20A through the same structure as the coupling structure of the second guide panel 20B and the first guide panel 20A.

In this case, the first to third bent portions 814*a'*, 814*b'*, and 814*c'* of the frame 80' may be inserted into the first to third grooves 21*g*, 22*g*, 23*g* of the first guide panel 20A (see FIGS. 8 to 10). In addition, the fourth bent portion 814*d'* of the frame 80' may be located on the fourth outer part 24V'. For example, the first to third bent portions 814*a'*, 814*b'*, and 814*c'* may be hook-connected to the first guide panel 20A, and the fourth bent portion 814*d'* may be hook-connected to a groove 24G' of the second guide panel 20B' through a hook 80H'. Furthermore, a fastening member such as a screw may be fastened to a hole 80F' of the fourth bent portion 814*d'* through a hole 24F' of the second guide panel 20B'. The second guide panel 20B' may be referred to as an edge-type guide panel 20B'.

Accordingly, the frame 80 may be coupled to the guide panel 20, and the direct-type optical layer OL may be located on the frame 80. The frame 80' may be coupled to the guide panel 20', and the edge type optical layer OL' may be located on the frame 80'. The first guide panel 20A may be shared by the guide panels 20 and 20'. A user may select the type of the second guide panel (20B, 20B') according to the type of the optical layer (OL, OL'), and couple it to the first guide panel 20A. Since there is no need to develop the first guide panel 20A separately according to the guide panels 20 and 20', the shared structure of the first guide panel 20A may be advantageous in reducing the development and manufacturing costs of the guide panels 20 and 20' and improving productivity. In addition, the coupling of the second guide panel (20B, 20B') and the first guide panel 20A may improve the rigidity of the guide panel (20, 20').

Figure 23:
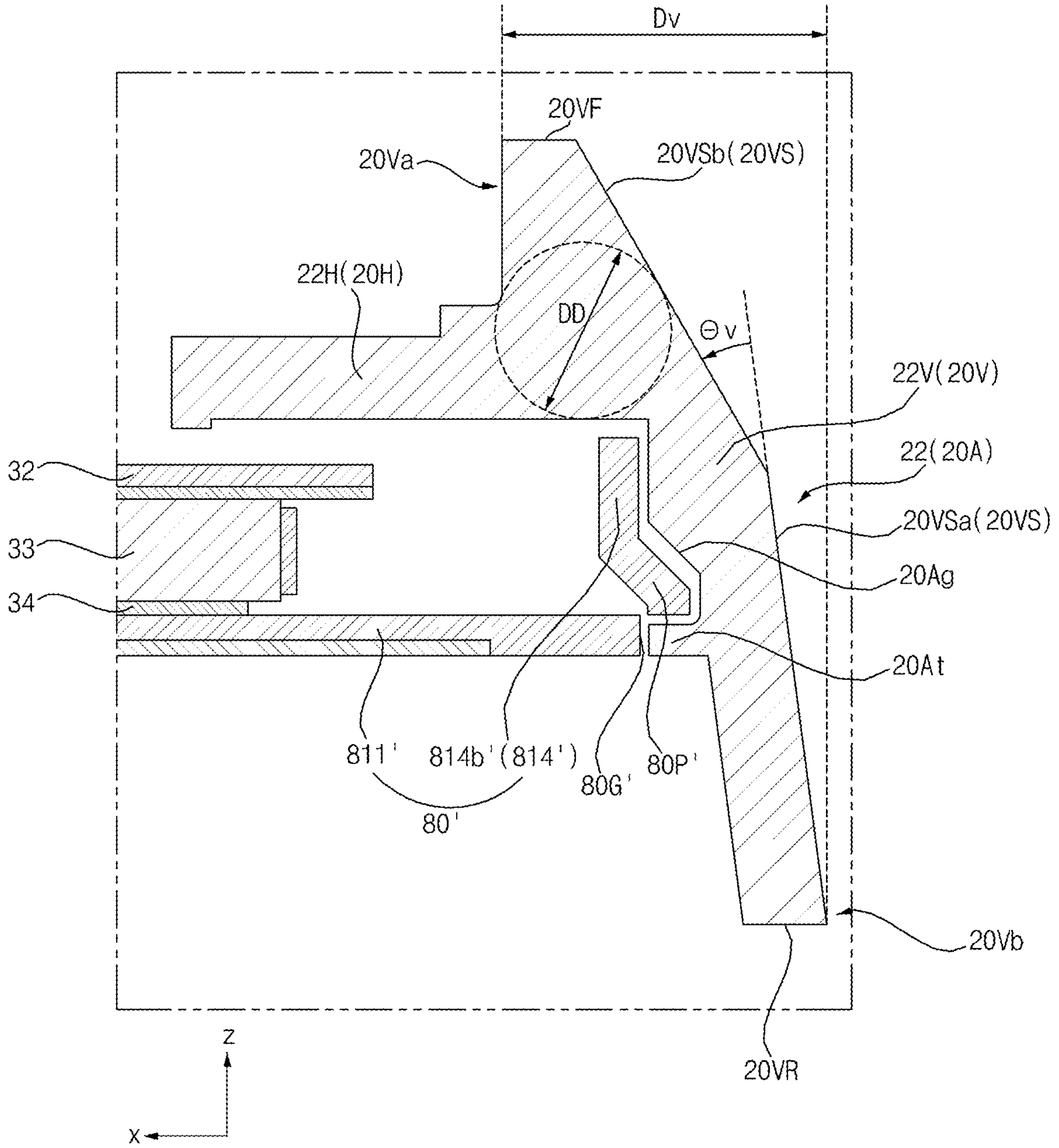

Referring to FIG. 23, the first guide panel 20A may include an outer part 20V and an inner part 20H. The outer part 20V may be referred to as a vertical part 20V, and the inner part 20H may be referred to as a horizontal part 20H. The outer part 20V may form an outer surface of the first guide panel 20A, and may be the first to third outer parts 21V, 22V, 23V described above with reference to FIGS. 8 to 10, etc. The inner part 20H may protrude from the inner surface of the outer part 20V in a direction intersecting with the outer part 20V, and may support the display panel 10 (see FIGS. 8 to 10). The inner part 20H may be the first to third inner parts 21H, 22H, and 23H described above with reference to FIGS. 8 to 10, etc.

A coupling groove 80G' may be formed in the side surface of the frame 80'. The coupling groove 80G' may be formed at the boundary between the flat portion 811' and the bent portion 814'. A pressed portion 80P' may be formed by being pressed from the inner surface of the bent portion 814' toward the outer part 20V of the first guide panel 20A while being adjacent to the flat portion 811', and the coupling groove 80G' may be formed in the pressed portion 80P'. A coupling protrusion 20At may protrude from the inner surface of the outer part 20V of the first guide panel 20A. A recessed portion 20Ag may be formed on the inner surface of the outer part 20V and may face the pressed portion 80P', and the coupling protrusion 20At may protrude from the recessed portion 20Ag. The coupling groove 80G' may be hooked to the coupling protrusion 20At. The pressed portion 80P' may be hooked to the recessed portion 20Ag. Similarly, the frame 80 may also have a hooking groove and a pressed portion, and the hooking groove and the pressed portion may be hooked to the coupling protrusion 20At and the recessed portion 20Ag.

Accordingly, the frame 80', 80 may be hook-coupled to the first guide panel 20A. Even without using a separate fastening member such as a screw, the frame 80', 80 may be coupled to the guide panel 20.

An inner end 20Va of the outer part 20V may be connected to the inner part 20H, and an outer end 20Vb of the outer part 20V may be spaced apart from the inner end 20Va in the horizontal direction by a certain distance Dv. An outer surface 20VS of the outer part 20V may connect a front end 20VF and a rear end 20VR of the outer part 20V. A first surface 20VSa of the outer surface 20VS may be opposite to a first portion of the inner surface of the outer part 20V on which the coupling protrusion 20At is formed. A second surface 20VSb of the outer surface 20VS may be opposite to a second portion of the inner surface of the outer part 20V on which the inner part 20H is formed.

If the second surface 20VSb is parallel to the first surface 20VSa, the thickness of a portion of the outer part 20V corresponding to a portion between the second surface 20VSb and the inner part 20H may be formed relatively large. Since the portion of the outer part 20V having a relatively large thickness may shrink, it is necessary to reduce the thickness.

The second surface 20VSb may form an incline with respect to the first surface 20VSa. The second surface 20VSb may be inclined by a certain angle (theta v) from the first surface 20VSa toward the inner end 20Va. As the angle (theta v) increases, the thickness of a portion of the outer part 20V corresponding to a portion between the second surface 20VSb and the inner part 20H may decrease. The portion of the outer part 20V corresponding to a portion between the second surface 20VSb and the inner part 20H may be circumscribed to a circle having a constant diameter DD. For example, the diameter DD may be 3.5 mm. Accordingly, the portion of the outer part 20V corresponding to a portion between the second surface 20VSb and the inner part 20H may have a relatively small thickness, thereby minimizing shrinkage.

Referring to FIGS. 1 to 23, a display device 1 may include: a display panel 10; a frame 80, 80' positioned behind the display panel 10; a first guide panel 20A positioned between the display panel 10 and the frame 80, 80', and extending along one side of the display panel 10; a second guide panel 20B, 20B' positioned between the display panel 10 and the frame 80, 80', and extending along the other side of the display panel 10; and an optical layer OL, OL' positioned between the display panel 10 and the frame 80, 80', and providing light to the display panel 10, wherein the second guide panel 20B, 20B' may be detachably coupled to the first guide panel 20A, and the display panel 10 and the frame 80, 80' may be coupled to the first and second guide panels 20A, 20B, 20A, 20B'.

The second guide panel 20B, 20B' may be hook-coupled to the first guide panel 20A.

The optical layer OL may include: a substrate 40 positioned on a front surface of the frame 80, 80'; a light source 51 mounted on the substrate 40; and a diffusion plate 31 between the display panel 10 and the light source 51, wherein the frame 80, 80' may include: a support portion 813 supporting the diffusion plate 31; a flat portion 811 which forms a step lowered from the support portion 813, and on which the substrate 40 is positioned; and a bent portion 814 bent from an edge of the support portion 813, wherein the bent portion 814 may be coupled to the first and second guide panels 20A, 20B.

The optical layer OL' may include: a light guide plate 33 positioned on the frame 80, 80'; a substrate 40' extending along one side of the light guide plate 33; and a light source 51' mounted on the substrate 40', and providing light to the one side of the light guide plate 33, wherein the frame 80, 80' may include: a flat portion 811' supporting the light guide plate 33; and a bent portion 814' bent from an edge of the flat portion 811', in which the bent portion 814' may be coupled to the first and second guide panels 20A, 20B'.

The display panel 10 may include: a first short side; a second short side opposite to the first short side; a first long side connecting the first short side and the second short side; and a second long side opposite to the first long side, and connecting the first short side and the second short side, wherein the first guide panel 20A may include: a first part 21 extending along the first short side; a second part 22 extending along the second short side; and a third part 23 extending along the first long side, wherein the second guide panel 20B, 20B' may extend along the second long side.

The first guide panel 20A may include: a first part 21 extending along a left side of the display panel 10; a second part 22 extending along a right side of the display panel 10; and a third part 23 extending along an upper side of the display panel 10, wherein the second guide panel 20B, 20B' may extend along a lower side of the display panel 10.

The first and second guide panels (20A, 20B; 20A, 20B') may be symmetrical with respect to a reference line extending vertically through a center of the first and second guide panels (20A, 20B; 20A, 20B').

One end of the second guide panel 20B, 20B' may be detachably coupled to the first part 21, and the other end of the second guide panel 20B, 20B' may be detachably coupled to the second part 22.

The second guide panel 20B, 20B' may include: an outer part 24V, 24V' forming an outer surface of the second guide panel 20B, 20B'; an extension part 24Hc, 24Hc' protruding from an inner surface of the outer part 24V, 24V' in a direction intersecting with the outer part 24V, 24V'; a first protruding part 24Ha, 24Ha' protruding upward from a left end of the extension part 24Hc, 24Hc', and coupled to the first part 21; and a second protruding part 24Hb, 24Hb' protruding upward from a right end of the extension part 24Hc, 24Hc', and coupled to the second part 22.

The first guide panel 20A may include: a coupling portion 21C formed at the first guide panel 20A, and coupled to the second guide panel 20B, 20B' to restrict a front-rear movement of the second guide panel 20B, 20B'; a first wall 21A spaced apart from the coupling portion 21C, and coupled to the second guide panel 20B, 20B' to restrict up-down and left-right movements of the second guide panel 20B, 20B'; and a second wall 21B opposite to the first wall 21A with respect to the coupling portion 21C, and coupled to the second guide panel 20B, 20B' to restrict the up-down and left-right movements of the second guide panel 20B, 20B'.

The first guide panel 20A may include: a first outer part 21V forming an outer surface of the first guide panel 20A; a first inner part 21H intersecting with the first outer part 21V; and a coupling portion 21C including a coupling hole 21Ch, and protruding from a rear surface of the first inner part 21H, wherein the second guide panel 20B, 20B' may include: a second outer part 24V, 24V' forming an outer surface of the second guide panel 20B, 20B'; a second inner part 24H; 24H' intersecting with the second outer part 24V, 24V'; and a coupling rib 24R, 24R' including a hook 24Rh, 24Rh', and protruding from a rear surface of the second inner part 24H; 24H', wherein the hook 24Rh, 24Rh' may be hooked to the coupling hole 21Ch.

The first guide panel 20A may include: a rib 21R protruding from the rear surface of the first inner part 21H, and extending along the first inner part 21H; a first wall 21A opposite to the first outer part 21V with respect to the rib 21R, the first wall 21A including one end connected to the rib 21R and the other end spaced apart from the rib 21R; and a second wall 21B opposite to the rib 21R with respect to the coupling portion 21C, the second wall 21B having a curved shape, wherein the second guide panel 20B, 20B' may further include: a first hooking portion 24A, 24A' protruding from the coupling rib 24R, 24R', and hooked to the first wall 21A; and a second hooking portion 24B, 24B' protruding from the second outer part 24V, 24V', and hooked to the second wall 21B.

The frame 80, 80' may include: a first bent portion 814*a*, 814*a*' inserted into a groove between the first outer part 21V and the rib 21R; and a second bent portion 814*d*, 814*d*' positioned on the second outer part 24V, 24V'.

The frame 80, 80' may include a coupling groove 80G' formed at one side of the frame 80, 80' facing an inner surface of the first guide panel 20A, and the first guide panel 20A may include a coupling protrusion 20At which protrudes from the inner surface of the first guide panel 20A, and to which the coupling groove 80G' is hooked.

The first guide panel 20A may further include: an inner part 20H to which the display panel 10 is coupled; and an outer part 20V which intersects with the inner part 20H, and at which the coupling protrusion is formed, wherein an outer surface of the outer part 20V may include: a first surface 20VSa opposite to a first portion of an inner surface of the outer part 20V at which the coupling protrusion is formed; and a second surface 20VSb opposite to a second portion of an inner surface of the outer part 20V at which the inner part 20H is formed, wherein the second surface 20VSb may form an incline with respect to the first surface 20VSa.

The effects of the display device according to the present disclosure are described as follows.

According to at least one of the embodiments of the present disclosure, it is possible to provide a structure in which a part of a guide panel is shared with a direct type backlight unit and an edge type backlight unit.

According to at least one of the embodiments of the present disclosure, it is possible to provide a structure in which a remaining part of guide panel is detachably coupled to a part of shared guide panel.

According to at least one of the embodiments of the present disclosure, it is possible to provide a coupling structure of a guide panel and a frame.

According to at least one of the embodiments of the present disclosure, it is possible to provide a structure that can minimize the shrinkage of guide panel.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:

a display panel comprising:
- a first short side,
- a second short side opposite to the first short side,
- a first long side connecting the first short side and the second short side, and
- a second long side opposite to the first long side, and connecting the first short side and the second short side;

a frame positioned behind the display panel;

a first guide panel extending along the first long side of the display panel;

a second guide panel extending along the second long side of the display panel; and an optical layer positioned between the display panel and the frame, and providing light to the display panel, wherein the first guide panel comprises:
- a first part extending along the first short side;
- a second part extending along the second short side; and
- a third part extending along the first long side, wherein the second guide panel comprises:
- an extension part extending along the second long side;
- a first protruding part protruding upward from a first end of the extension part, and detachably coupled to the first part; and
- a second protruding part protruding upward from a second end of the extension part, and detachably coupled to the second part, and wherein the display panel and the frame are coupled to the first and second guide panels.

2. The display device of claim 1, wherein the second guide panel is hook-coupled to the first guide panel.

3. The display device of claim 1, wherein the optical layer comprises:
- a substrate positioned on a front surface of the frame;
- a light source mounted on the substrate; and
- a diffusion plate between the display panel and the light source, wherein the frame comprises:

a support portion supporting the diffusion plate;

a flat portion which forms a step lowered from the support portion, and on which the substrate is positioned; and a bent portion bent from an edge of the support portion, wherein the bent portion is coupled to the first and second guide panels.

4. The display device of claim 1, wherein the optical layer comprises:

a light guide plate positioned on the frame;

a substrate extending along one side of the light guide plate; and a light source mounted on the substrate, and providing light to the one side of the light guide plate, wherein the frame comprises:

a flat portion supporting the light guide plate; and a bent portion bent from an edge of the flat portion, wherein the bent portion is coupled to the first and second guide panels.

5. The display device of claim 1, wherein the second guide panel extends along the second long side.

6. The display device of claim 1, wherein the first part extends along a left side of the display panel formed the first short side, wherein the second part extends along a right side of the display panel formed the second short side, wherein the third part extends along an upper side of the display panel formed the first long side, and wherein the second guide panel extends along a lower side of the display panel formed the second long side.

7. The display device of claim 6, wherein the first and second guide panels are symmetrical with respect to a reference line extending vertically through a center of the first and second guide panels.

8. The display device of claim 6, wherein the second guide panel comprises:

an outer part forming an outer surface of the second guide panel, wherein the extension part protrudes from an inner surface of the outer part in a direction intersecting with the outer part, wherein the first protruding part protrudes upward from a left end of the extension part, and wherein the second protruding part protrudes upward from a right end of the extension part.

9. The display device of claim 1, wherein the first guide panel comprises:

a coupling portion formed at the first guide panel, and coupled to the second guide panel to restrict a front-rear movement of the second guide panel;

a first wall spaced apart from the coupling portion, and coupled to the second guide panel to restrict up-down and left-right movements of the second guide panel; and a second wall opposite to the first wall with respect to the coupling portion, and coupled to the second guide panel to restrict the up-down and left-right movements of the second guide panel.

10. The display device of claim 1, wherein the frame comprises a coupling groove formed at one side of the frame facing an inner surface of the first guide panel, wherein the first guide panel comprises a coupling protrusion which protrudes from the inner surface of the first guide panel, and to which the coupling groove is hooked.

11. The display device of claim 10, wherein the first guide panel further comprises:

an inner part to which the display panel is coupled; and an outer part which intersects with the inner part, and at which the coupling protrusion is formed, wherein an outer surface of the outer part comprises:

a first surface opposite to a first portion of an inner surface of the outer part at which the coupling protrusion is formed; and a second surface opposite to a second portion of an inner surface of the outer part at which the inner part is formed, wherein the second surface forms an incline with respect to the first surface.

12. A display device comprising:

a display panel;

a frame positioned behind the display panel;

a first guide panel positioned between the display panel and the frame, and extending along a first side of the display panel;

a second guide panel positioned between the display panel and the frame, and extending along a second side of the display panel; and an optical layer positioned between the display panel and the frame, and providing light to the display panel, wherein the second guide panel is detachably coupled to the first guide panel, wherein the display panel and the frame are coupled to the first and second guide panels wherein the first guide panel comprises:

a first outer part forming an outer surface of the first guide panel;

a first inner part intersecting with the first outer part; and a coupling portion including a coupling hole, and protruding from a rear surface of the first inner part, wherein the second guide panel comprises:

a second outer part forming an outer surface of the second guide panel;

a second inner part intersecting with the second outer part; and a coupling rib including a hook, and protruding from a rear surface of the second inner part, and wherein the hook is hooked to the coupling hole.

13. The display device of claim 12, wherein the first guide panel comprises:

a rib protruding from the rear surface of the first inner part, and extending along the first inner part;

a first wall opposite to the first outer part with respect to the rib, the first wall including a first end connected to the rib and a second end spaced apart from the rib; and a second wall opposite to the rib with respect to the coupling portion, the second wall having a curved shape, wherein the second guide panel further comprises:

a first hooking portion protruding from the coupling rib, and hooked to the first wall; and a second hooking portion protruding from the second outer part, and hooked to the second wall.

14. The display device of claim 13, wherein the frame comprises:

a first bent portion inserted into a groove between the first outer part and the rib; and a second bent portion positioned on the second outer part.

* * * * *